United States Patent
Hansen

(10) Patent No.: US 9,651,277 B2
(45) Date of Patent: May 16, 2017

(54) CONCENTRATING SOLAR COLLECTOR AND PRE-FORMED FRESNEL ARRAY REFLECTOR PANEL

(71) Applicant: Harold Travis Hansen, Portage, MI (US)

(72) Inventor: Harold Travis Hansen, Portage, MI (US)

(*) Notice: Subject to any disclaimer, the term of this patent is extended or adjusted under 35 U.S.C. 154(b) by 791 days.

(21) Appl. No.: 13/832,155

(22) Filed: Mar. 15, 2013

(65) Prior Publication Data

US 2014/0261387 A1    Sep. 18, 2014

(51) Int. Cl.
| | |
|---|---|
| *F24J 2/02* | (2006.01) |
| *F24J 2/54* | (2006.01) |
| *F24J 2/38* | (2014.01) |
| *F24J 2/10* | (2006.01) |

(52) U.S. Cl.
CPC .............. *F24J 2/02* (2013.01); *F24J 2/542* (2013.01); *F24J 2002/108* (2013.01); *F24J 2002/5458* (2013.01); *Y02B 40/18* (2013.01); *Y02E 10/47* (2013.01); *Y10T 29/49355* (2015.01)

(58) Field of Classification Search
CPC ........ F24J 2/02; F24J 2/542; F24J 2/38; F24J 2002/108; F24J 2002/5458; Y02B 40/18; B29D 11/00596
USPC ........ 126/688, 692, 696, 600; 359/573, 576, 359/558
See application file for complete search history.

(56) References Cited

U.S. PATENT DOCUMENTS

| | | | | |
|---|---|---|---|---|
| 811,274 | A * | 1/1906 | Carter | F24J 2/07 126/651 |
| 3,266,151 | A * | 8/1966 | Berent | G04B 49/02 116/41 |
| 6,315,059 | B1 * | 11/2001 | Geldean | E21B 7/028 173/112 |
| 8,151,787 | B1 * | 4/2012 | Sivert | F24J 2/38 126/608 |
| 2007/0033828 | A1 * | 2/2007 | Hartkop | A23N 12/08 34/443 |

(Continued)

OTHER PUBLICATIONS

Papillon solar cooker. Solar Cookers Internal Network. http://solarcooking.wikia.com/wiki/Papillon.*
Fotos. Solarkocher Papillon. http://www.solar-papillon.com/.*

*Primary Examiner* — Avinash Savani
*Assistant Examiner* — Rabeeul Zuberi

(57) ABSTRACT

Apparatus for a concentrating solar collector is disclosed, comprising: A nested main frame and reflector carriage with vertically folding one-piece preformed reflector support panels, to which individually replaceable pieces of mirror-like material of various kinds may be mounted to make a Fresnel-type array. A hand-winch operated cable system provides for a full range of reflector altitude adjustment. An alignment guide allows assessment of solar tracking alignment without gazing toward the focal area. A griddle-like flattop receiver is used for frying foods, and an adjustable rack facilitates suspension of cooking pots in the focal area to receive unobstructed, concentrated solar energy. Also described is a method for making the reflector support panels. One embodiment of the apparatus has a lower frame portion substantially forming a rolling chassis. An additional embodiment describes lower frame structure for a fixed location installation.

9 Claims, 13 Drawing Sheets

(56) References Cited

U.S. PATENT DOCUMENTS

2009/0283021 A1* 11/2009 Wong ................ B23K 37/0461
  108/116
2011/0232631 A1* 9/2011 Bohmer .................... F24J 2/07
  126/606

* cited by examiner

CONCENTRATING SOLAR COLLECTOR AND PRE-FORMED FRESNEL ARRAY REFLECTOR PANEL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, TABLE OR COMPUTER PROGRAM LISTING

Not Applicable

BACKGROUND OF THE INVENTION

Field of the Invention

This invention relates to distributed-scale apparatus for concentration and collection of solar energy.

Discussion of Prior Art

As non-renewable energy resources such as coal, oil, and natural gas become more scarce and costly to obtain, the need for practical ways to utilize renewable energy sources grows. Solar energy investment in industrialized regions has been influenced by preexisting patterns and infrastructure for distribution of electrical power from large, centralized facilities. Several large facilities for centralized solar thermal generation of electric power have been completed in the US and other countries. These have typically used a great number of ground-based heliostats to reflectively concentrate solar energy to a focal area containing a tower-mounted receiver. Thermal energy collected by the receiver is then is transferred to drive nearby steam turbines for generation of electric power, which is then fed into to the existing grid for distribution. Energy consumers in some areas have installed local systems, which avoid the transmission losses inherent in distribution from centralized plants, but usually operate at the lower efficiency of photovoltaic (PV) conversion. Locally collected solar thermal energy is also used for heating buildings or adjunctively to heat water. Such systems offer greater efficiency, avoiding both energy transmission and conversion losses. Local apparatus for concentrating solar thermal energy is much less common, though cooking is one relatively popular use.

Many less-developed areas of the world have seen significant deforestation and environmental degradation as a result of people using traditional fuels for cooking fires. Efforts have been made to encourage use of solar cookers in these areas, with limited success. However, there is an increasing need to encourage local use of solar energy in more industrialized regions, also. Populations with a lifestyle and economy that are more dependent upon fossil fuels will suffer greater stress, as those fuels become more costly. To the extent that means for renewable energy use are familiar and available to those populations, difficulties stemming from a culture of dependence upon fossil fuel can be mitigated.

Development and implementation of apparatus for local scale, distributed solar thermal energy collection and use confronts many of the same difficulties as large-scale installations. Apparatus for local concentration of solar energy offers a greater range of uses than non-concentrating solar collectors, but presents a greater challenge for design and cost efficiency. Beyond the costs of materials, manufacturing and maintenance, development of apparatus suitable for home, farm, or small business use also contends with issues such as space requirements, safety, portability and ease of use.

Prior art in this area has sometimes employed focusing lenses for concentration; an example is U.S. Pat. No. 4,913,130 (Inagaki, Sawata.) Reflecting concentrators have been more common, tending to be less costly. However, the incident angle of sunlight to a lens or reflector that is fixed in position will change continuously as the earth turns, thus changing the resulting reflective angle. A concentrator apparatus therefore must track the apparent movement of the sun across the sky, in order to achieve concentration of incident light to the desired target, or focal area, where the receiver of the apparatus is located.

Solar tracking by a concentrator must be done through two axes, corresponding to altitude and azimuth of the sun's apparent position in the sky. Maintenance of automated mechanical solar tracking has been a significant cost barrier for large, centralized solar thermal electric generation facilities. Concentrators with individually moving reflectors, even at a smaller scale, require a complicated mechanical infrastructure. An example is in U.S. Pat. No. 6,945,246 (Kinoshita).

However, smaller scale concentrators may also use reflective surface in the shape of an elliptic paraboloid, or a plurality of flat reflectors in a Fresnel array approximating the same effect. Such reflectors move upon a common framework to track the sun. This arrangement simplifies the mechanical infrastructure needed. "Parabolic dish" reflectors have been assembled from wedge-shaped sections of flat, polished sheet metal that are placed into a special curved frame to approximate a paraboloid shape, such as in U.S. Pat. No. 3,797,476 (Tarcici), and U.S. Pat. No. 6,863,065 (Marut, Brunette). An example of such parabolic dish concentration that has seen some commercial success is the German SK-series of cookers, designed by Dr. Dieter Seifert of EG Solar. At the time of this writing, information was accessible via: http://solarcooking.wikia.com/wiki/SK14. A similar design had begun production commercially in the US at the time of this writing, under the name "Sun Power Cooker" and information was accessible via: http://sunpowercooker.com/.

In dish type concentrators the receiver and the user can cast shadows over reflector area in some designs, reducing efficiency. Cooking vessels positioned over reflectors, or that must be lifted over them are more likely to may spill and spatter food upon the reflectors, also reducing efficiency. Some designs have partial paraboloid reflectors separated and foldable for storage or transport. An example of this is a parabolic cooker that has been subsidized and promoted by government in China, known as the Ao Chi F800. At the time of this writing, information was accessible via: http://solarcookingwikia.com/wiki/Ao_Chi_Solar_Cooker. The Ao Chi F800 reflective surface is not very durable, being a metallized plastic film. The film is produced in a flat sheet, and adhered to the curved, pre-cast paraboloid section after cutting the film into small pieces, to minimize wrinkles in the material. The receiver sits above the reflector area, with the resultant problems of spillage. This unit is also limited in its reflector size and power, in favor of user access to the receiver.

User access to the receiver for cooking-related activity becomes more problematic as the size of reflectors is increased for greater concentrator capacity. Similarly, the challenge of providing a convenient way to perform manual solar tracking adjustments grows in proportion to reflector area.

Fresnel reflector designs have been produced for the purpose of reducing reflector bulkiness and cost, such as in U.S. Pat. No. 4,350,412 (Steenblik) and U.S. Pat. No. 4,561,425 (Long, Ware). However, these implementations still require costly, laborious and difficult fabrication techniques, or lack a surrounding structure that provides good ease of use.

The prior art known to the applicant that is nearest in form to the current invention was based upon the "Papillon" Solar Cooker, developed by Jochen Dessel and Prof. Bernd Hafner of the Solarinstitut Jüich (Germany.) At the time of this writing, information on the Papillon was accessible at: http://solarcooking.wikia.com/wiki/Papillon and http://www.solar-papillon.com/. The Papillon has two reflector sections, similar to the Ao Chi design, but separated further from each other by a sizeable gap, with the receiver positioned above the gap. This avoids shadowing and food spillage problems. The Papillon's reflectors are of polished sheet aluminum in strips, fitted to a curved frame to approximate a continuous paraboloid section. Fabrication and assembly is costly, the paraboloid section shape is rather bulky, and the user approach to the focus becomes difficult when the sun is lower in the sky. The altitude adjustment mechanism of the Papillon comprises a sliding-groove and pinch-bolt device to attain and hold reflector position. The location of the mechanism is inconvenient and possibly hazardous to the user, as it requires reaching over the focal area past a hot cooking vessel. Azimuth adjustments require tilting the entire apparatus to pivot it upon its one axle or skidding its base foot sideways, risking spillage from the vessel at the focal area.

Lorin Symington of the Canadian non-profit corporation ASTRA modified the Papillon design, in part by using flat glass mirrors in a Fresnel-type array. This design was dubbed the "Iron Butterfly," and demonstrated in West Africa in 2008. At the time of this writing, photo documentation was accessible via: http://solarcooking.wikia.com/wiki/Butterfly_(Iron).

The Iron Butterfly's reflector arrays are in a trapezoidal shape that does not maximize reflector aperture relative to outer dimensions of the apparatus, in use or in the (folded) storage position. Mounting and aligning the Fresnel array of mirrors requires a complex and heavy backing structure. A backing plate for each flat reflector in the array must be aligned and attached to framing with individual welded supports, making fabrication laborious and costly, and adding substantially to the weight of the apparatus. Information on the process for making the Iron Butterfly's reflector panels was accessible at the time of this writing via: http://www.astraonline.ca/?p=SFT. Though some success has been demonstrated, the difficult and laborious multi-step process is vulnerable to error and imprecision at various stages.

The Iron Butterfly's parallel-square reflector carriage features cross bracing removed to one end of the carriage, so that the user can closely approach and reach the focal area from the opposite end when the sun is at lower altitudes. But flexing and distortion of the non-braced portion of the carriage may reduce focal precision and usable energy, and the facilitation of user proximity to the focal area increases the likelihood of operator exposure to concentrated solar energy. The bracing location also limits the range of carriage travel; with the sun directly overhead, proper focus requires compensatory tilting of the entire apparatus. The Iron Butterfly's spooling mechanism for cable-controlled adjustment of reflector altitude is located near the focal area, similar to the Papillon design, so use is difficult and possibly hazardous. It requires the user to reach over the focal area and past a hot cooking vessel, or to walk around to the opposite side of the apparatus and duck or reach under reflector positioning lines, while stepping over the chassis/wheels. As in the case of the Papillon, azimuth and altitude adjustment also require the operator to gaze directly at the focal area to gauge the location and intensity of concentrated sunlight. The user position of the Papillon and Iron Butterfly is on the same side of the receiver that reflected, concentrated solar energy strikes when the sun is at lower altitudes, so that diffuse reflection to the user is greater. Protective eyewear may mitigate the discomfort and possible hazard of intense solar radiation reflected from the receiver to the user's eyes. However, positional adjustments are difficult and uncomfortable to perform accurately in this manner, further compromising ease of use and general efficacy of the concentrator.

Suspension lines to hold the Iron Butterfly's reflector panels in operating position are attached to the panel carriage asymmetrically and lack a means to maintain equal tension between them. This may contribute to flexion of the reflector panels with consequent focal imprecision.

BRIEF SUMMARY OF THE INVENTION

My solar collector in its preferred embodiment provides a nested frame and reflector carriage with vertically folding reflector panels. The lower frame geometry facilitates a novel cable system for a full range of reflector adjustment by easy, manual operation. The reflectors swing away from the user's position, so that concentrated energy strikes the opposite side of the receiver and minimizes exposure of the user to diffuse reflection. Also provided is a Fresnel-type reflector support panel composed of a single, preformed piece, with integral, pre-aligned mounting surfaces for flat reflective material. This eliminates the heavy backing structure of prior art, and permits simpler and less costly assembly of a Fresnel reflector array. The reflector support panels, carriage, frame and cable system permit a larger, more precisely focused reflector area to fold to a relatively compact size for storage or portability. An adult user of ordinary physical capability can easily, quickly and comfortably make positional adjustments to reflectors, from the same safe position in which cooking activity is performed. The solar collector further includes an alignment guide placed away from the focal area, obviating repeated exposure of a user's eyes to receiver glare during reflector adjustments. It further provides a flattop receiver that shields the user from glare, providing a flat, horizontal surface where flat-bottomed pots and pans can be heated, as on a smooth-top stove. The flattop receiver also provides a griddle-like direct cooking surface. An additional support rack adjusts to suspend larger pots and pans of various sizes in the focal area for direct heating.

DETAILED DESCRIPTION OF THE INVENTION

Features of Example Embodiments

What follows describes two exemplary embodiments of the solar collector (see FIG. 1, FIG. 2*b*), with some parts and aspects of the invention directed toward those embodiments, for use as a solar cooker. Many uses other than cooking are possible; but cooking is likely to be the most common use.

Figure 2:
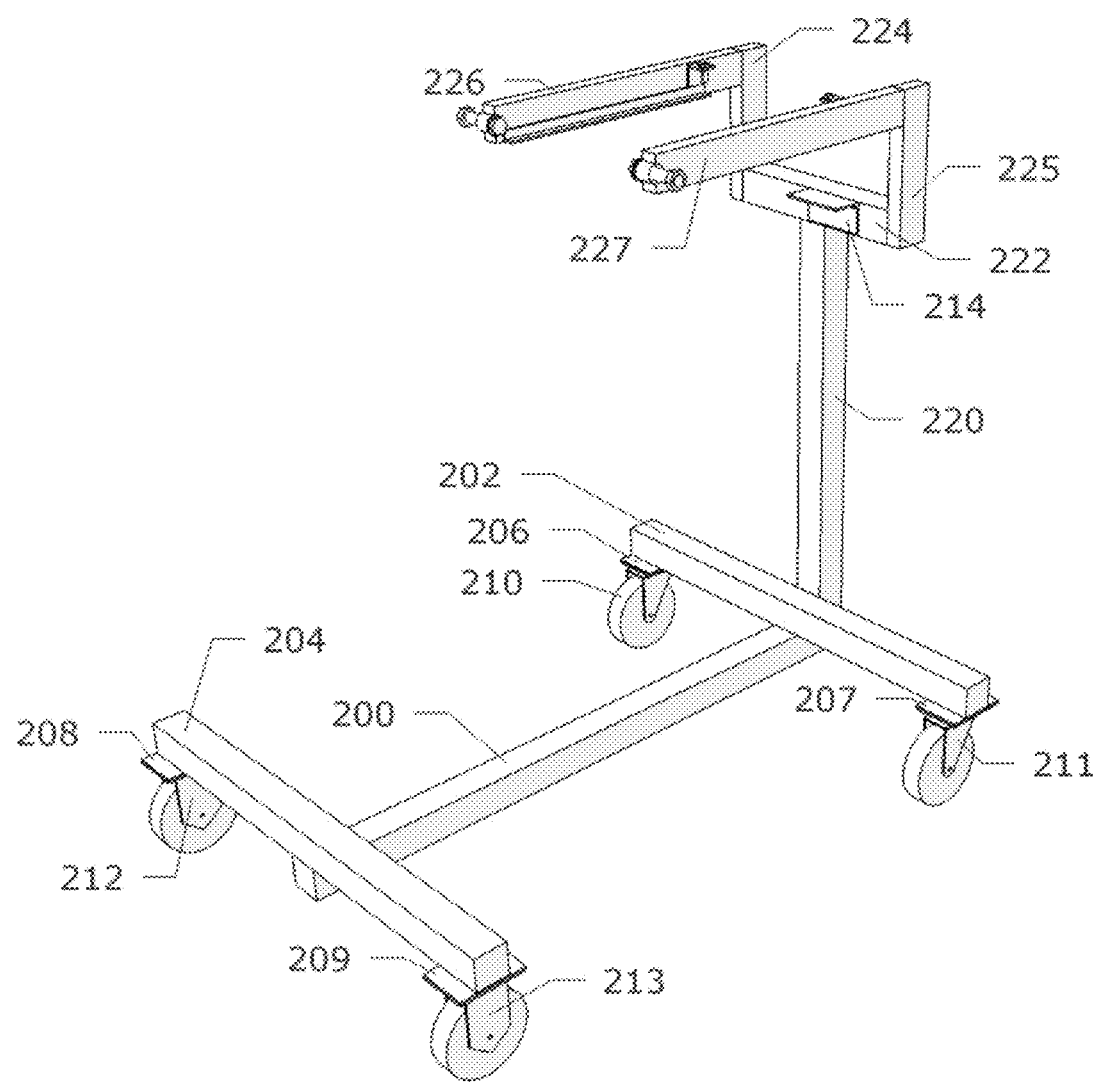
FIG. 2 is a perspective view from the rear of the main frame of the preferred embodiment.
Figure 2B:
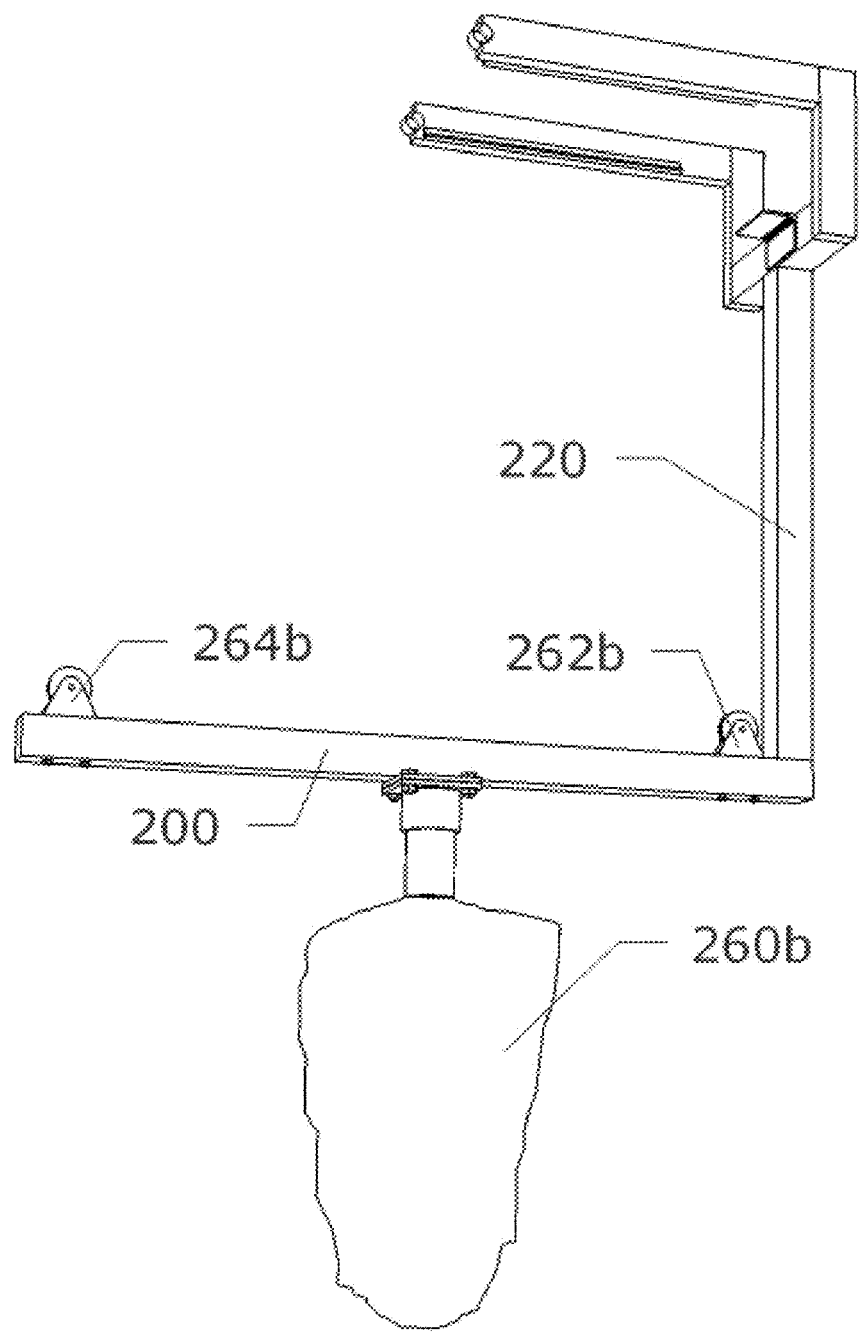
FIG. 2*b* is a side view of an additional embodiment of the main frame, for installation of the solar collector in a fixed location.
Figure 3:
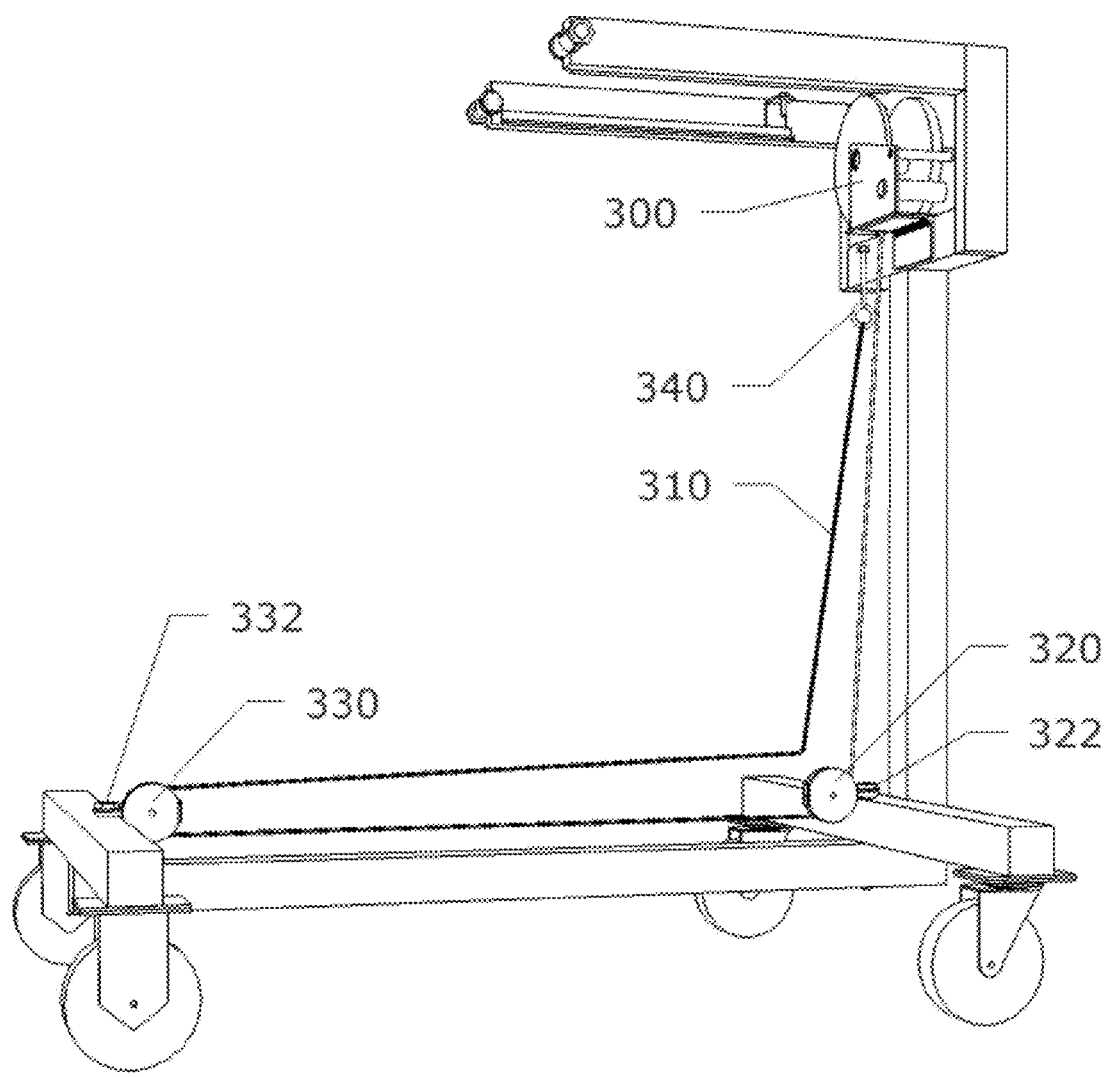
FIG. 3 is a perspective side-view of the altitude cable system.
Figure 5:
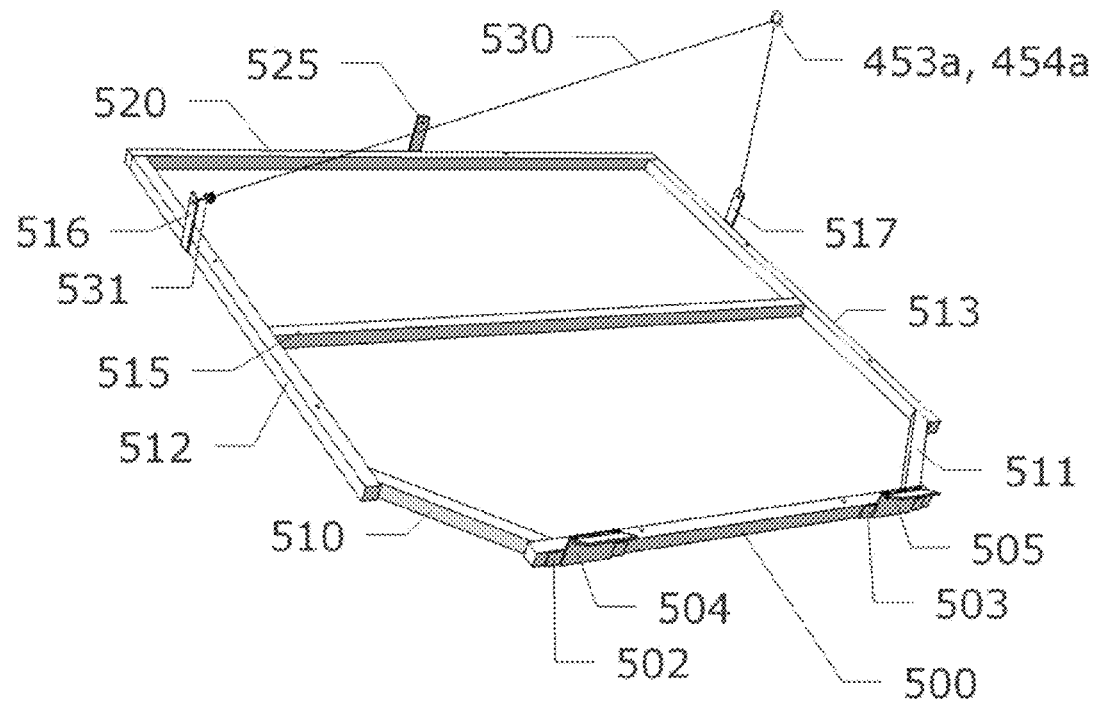
FIG. 5 is a perspective view of one of the collector's two reflector support panel frames, shown with attached suspension cable.
Figure 6:
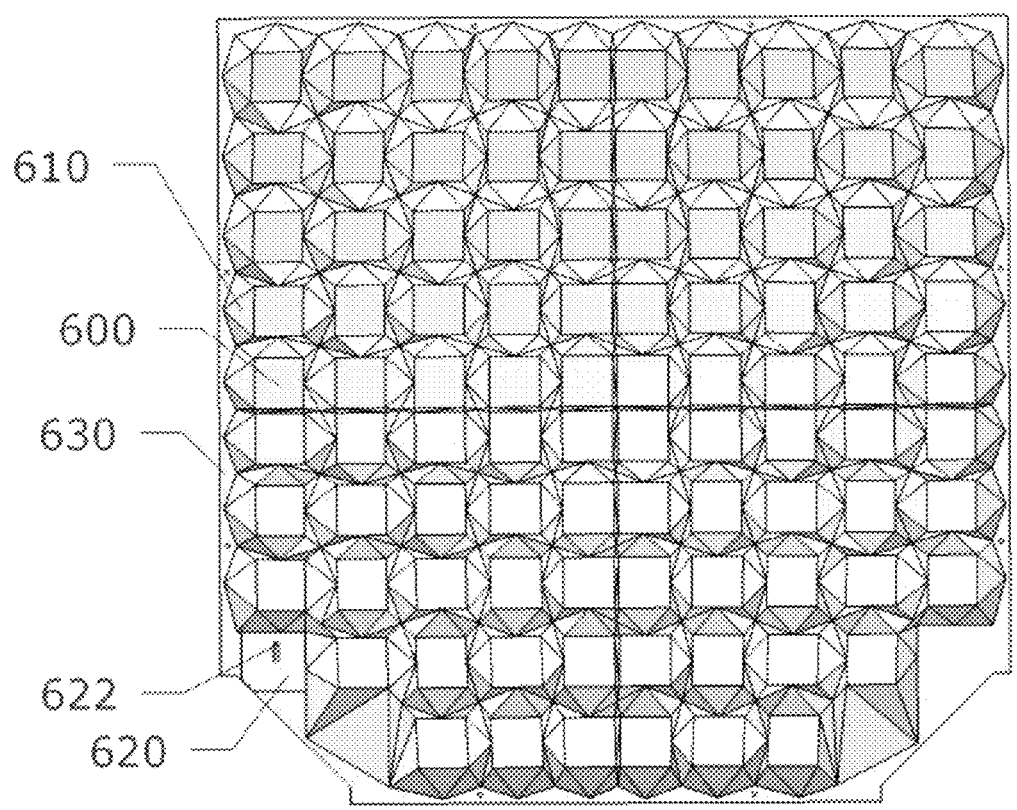
FIG. 6 is a plan view from directly above one of the collector's two reflector support panels, with attached alignment guide.
Figure 6A:
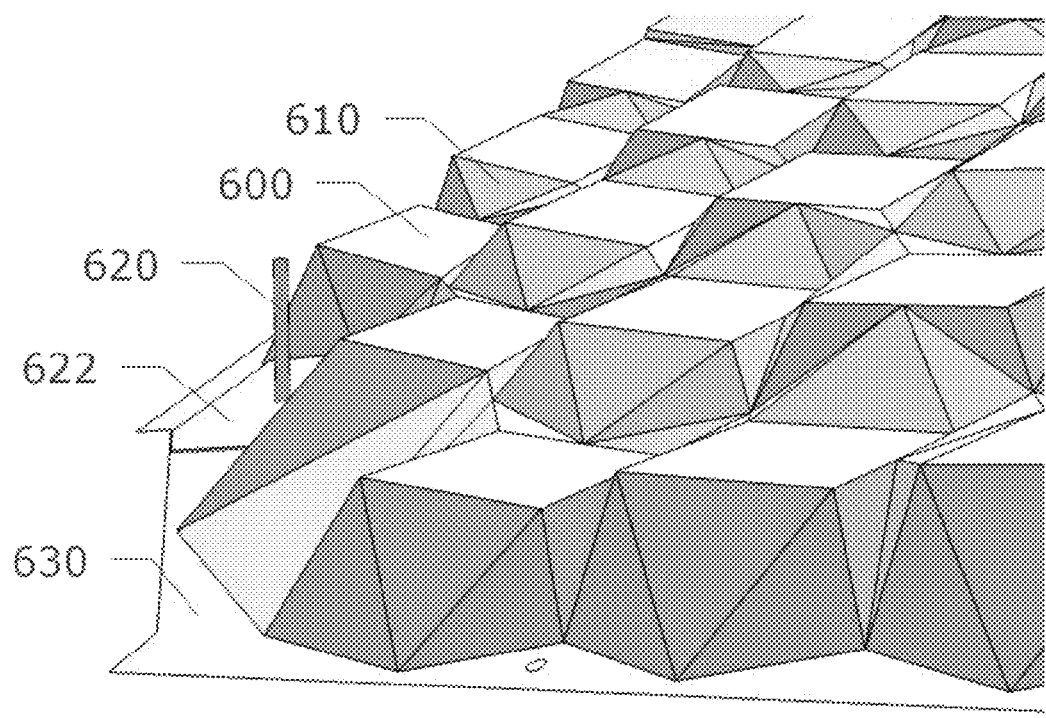
FIG. 6*a* is a perspective view of a portion of one of the collector's two reflector support panels, enlarged for detail.

The flattop receiver can be used as a griddle to fry food directly upon its top surface, or used with flat-bottomed cooking vessels resting on it, similar to a smooth-top stove. Concentrating reflector support panels are shown In open, operating position (see FIG. 1, FIG. 1*a*). The reflector carriage and reflector support panels are also shown positioned for storage (see FIG. 1*b*). The main frame is shown with a rolling chassis (see FIG. 2), so that the apparatus is easily moved over a firm, smooth surface, and also shown installed to a fixed-location pivot (see FIG. 2*b*). There Is a novel cable system for convenient manual altitude adjustment of reflectors (FIG. 3). Most materials used in the preferred embodiment are of relatively low cost and widely available. The main frame, reflector carriage, and reflector frame (see FIG. 5) are of mild steel in standard profiles of tubing, angle and bar. Other features are made of commonly available steel stock and fastener parts such as sheet, rod, cable, bolts, and nuts. The reflector support panels (see FIG. 6) are of thermoformed sheet plastic.

Main Frame

The solar collector has a main frame (FIG. 2) with an essentially horizontal base beam 200. Base beam 200 is of square tubing and length approximately twice that of receiver arms 226, 227. Front and rear axletrees 202, 204 of like material are transversely joined by welding at their midpoints to the topside of the ends of base beam 200, to form a chassis. Caster mounting plates 206, 207, 208, 209 are welded to the underside of axletrees 202, 204 at both of their ends. Swivel casters 210, 211 are attached by welding to caster mounting plates 206, 207. Fixed casters 212, 213 are attached by welding to caster mounting plates 208, 209. A vertical support 220 of square tubing is perpendicularly joined by welding to the front end of base beam 200. A transverse member 222 of like material is joined by welding to the upper end of vertical support 220, to form a tee. Risers 224, 225 of rectangular tubing, are perpendicularly joined by welding to each end of transverse member 222, and extend further upward. The vertical support 220, transverse member 222 and front frame risers 224, 225 together form a wishbone shape at the front of the main frame. A winch support 214, consisting of a piece of steel angle, is attached by welding to the rear side of transverse member 222. Winch support 214 is oriented with its vertex at the rear upper edge of transverse member 222. The top surfaces of transverse member 222 and winch support 214 provide a mounting area for a winch 300 (FIG. 3).

Figure 2A:
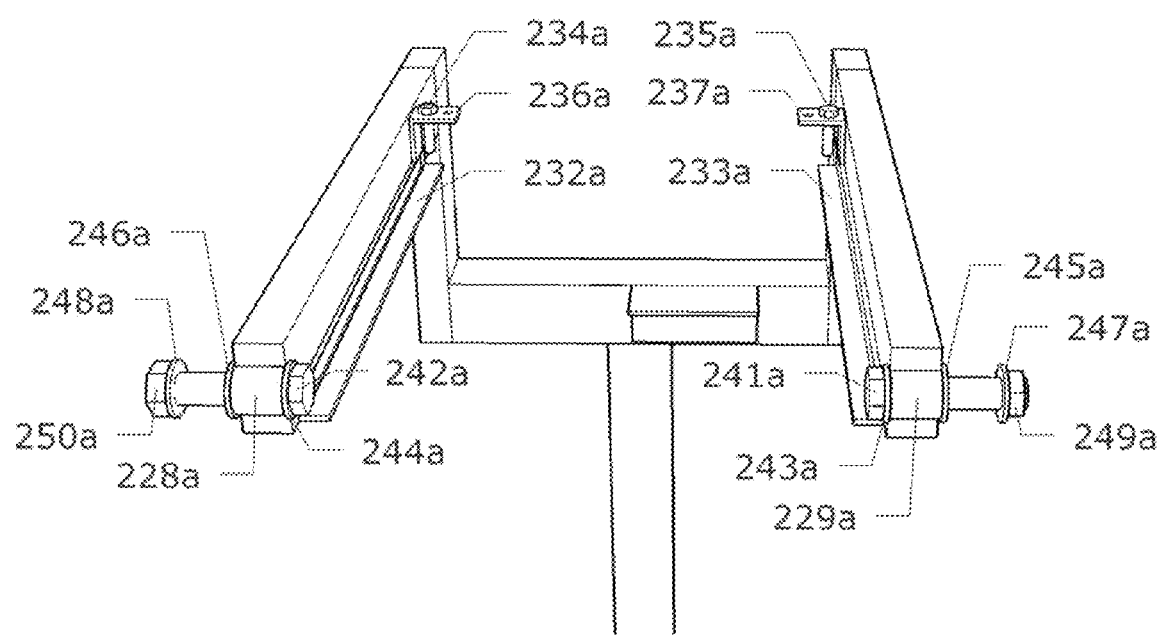
FIG. 2*a* is a detail view from the rear, of the upper portion of the main frame.
Figure 4:
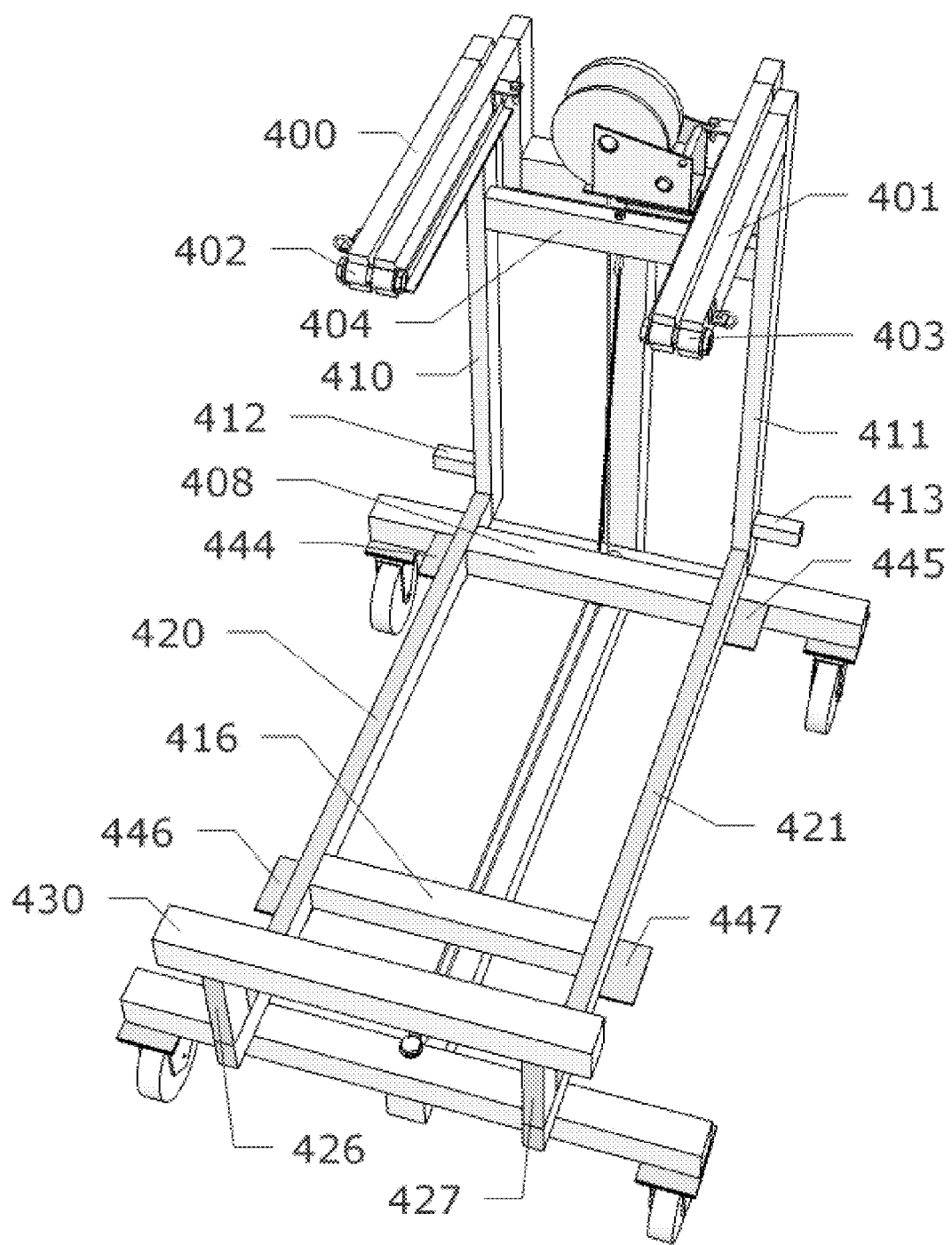
FIG. 4 is a perspective view from above and rear, of the collector with reflector carriage.

Receiver arms 226, 227 of rectangular steel tubing are joined by welding to the rear faces front frame risers 224, 225 at the top. Receiver arms 226, 227 extend horizontally rearward toward the focal area of the concentrator, are of length approximately half that of base beam 200, and terminate on opposite sides of the center of the focal area. Frame bushings 228*a*, 229*a* (see FIG. 2*a*) are set into concave, semicircular cutouts in the sides of each end of receiver arms 226, 227 and attached transversely to them by welding. Frame bushings 228*a*, 229*a* are steel and serve as sleeve bearings, carrying steel pivot bolts 241*a*, 242*a*. Pivot bolts 241*a*, 242*a* serve as rotational center pins, around which the reflector carriage (see FIG. 4) pivots. Steel lock nuts 249*a*, 250*a* are threaded onto the ends of the pivot bolts 241*a*, 242*a*. Steel thrust washers 243*a*, 244*a* are placed under the heads of the pivot bolts 241*a*, 242*a*. Steel thrust washers 245*a*, 246*a* are placed between frame bushings 228*a*, 229*a*, and carriage bushings 402, 403 (see FIG. 4). Steel thrust washers 247*a*, 248*a* are placed under lock nuts 249*a*, 250*a*.

Receiver support rails 232*a*, 233*a* are lengths of steel angle with vertices aligned to the inner, lower edges of receiver arms 226, 227, and attached by welding to the inner sides of receiver arms 226, 227. Receiver retainers 236*a*, 237*a* (see FIG. 2*a*) are short pieces of steel angle with vertices aligned to the upper, inner edge of the receiver arms 226, 227 and attached by welding to the inner side of receiver arms 226, 227 near their front ends. The horizontal sides of receiver retainers 236*a*, 237*a* each have an inner and an outer hole. Retainer bolts 234*a*, 235*a* are placed in either the two inner or the two outer holes, to retain either the flattop receiver (see FIG. 7) or the pot and pan rack (see FIG. 8) respectively, in proper position at the focal area and prevent it sliding and tipping during operation of the solar collector.

Altitude Cable System

The altitude cable system (FIG. 3) of the preferred embodiment facilitates manually raising, lowering and holding the reflectors in position, and is operated by a hand-crank winch 300. Winch 300 is a widely available standard product, made of steel and often supplied with a length of steel cable pre-attached to the reel. Winch 300 is mounted by welding upon winch support 214 and transverse member 222 of the main frame.

Steel altitude cable 310 passes from winch 300 downward to a common steel primary pulley 320, which is attached to the main frame at the front end by a common bolt and nut 322 through front axletree 202 and base beam 200. Primary pulley 320 provides an approximate right-angle directional change of altitude cable 310, which then passes horizontally toward the rear of the main frame to secondary pulley 330. Secondary pulley 330 is attached to the main frame at the rear end by a common bolt and nut 332 through rear axletree 204 and base beam 200, and changes the direction of altitude cable 310, so that it courses back toward the front of the main frame. Altitude cable 310 bends upward around the lower front edge of lower carriage arm front brace 408 (See FIG. 4). FIG. 3 shows cable 310 coursing upward from the bend, though lower carriage arm front brace 408 is not pictured. Altitude cable 310 is attached terminally to eyebolt 340, which passes up through holes in the top and bottom faces of upper carriage brace 404, and is held in that position, eye-end down, by a common lock nut (see FIG. 4.) Upper carriage brace 404 is not pictured in FIG. 3.

Reflector Carriage

The reflector carriage (see FIG. 4) has two upper carriage arms 400, 401 of rectangular steel tubing which are parallel to, and lie outside of, the main frame's receiver arms 226, 227, when in storage position. Carriage bushings 402, 403 are set into concave, semicircular cutouts in the sides of each rear end of upper carriage arms 400, 401 and attached transversely to them by welding. Carriage bushings 402, 403 are coaxial with frame bushings 228a, 229a and serve as sleeve bearings around pivot bolts 241a, 242a (see FIG. 2a). Pivot bolts 241a, 242a pass through the pairs of adjacent frame and carriage bushings on each side of the focal area. Frame bushings 228a, 229a together with pivot bolts 241a, 242a and carriage bushings 402, 403 constitute reflector carriage pivots. The pivotable reflector carriage is thus suspended from the main frame by pivot bolts 241a, 242a.

Figure 4A:
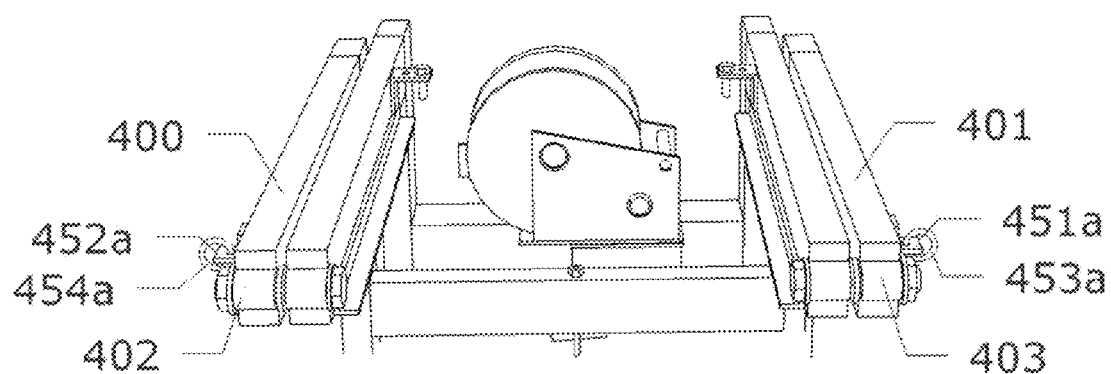
FIG. 4*a* is a detail view from the rear, of the upper portion of the reflector carriage.

Upper suspension cable ears 451a, 452a (see FIG. 4a), are short pieces of steel angle attached by welding to the outer faces of upper carriage arms 400, 401 adjacent to their rear ends. Suspension cable rings 453a, 454a each pass through a hole in the upper suspension cable ears 451a, 452a and help to equalize tension in each reflector frame suspension cable 530 (see FIG. 5).

At the front ends of upper carriage arms 400, 401, front carriage members 410, 411 (see FIG. 4) of like material are attached perpendicularly by welding. Upper carriage brace 404 of square steel tubing is attached perpendicularly by welding, to connect front carriage members 410, 411 in the upper third of their height. Eyebolt 340 of the altitude cable system (see FIG. 3), is attached, eye-end down, with a common locknut approximately midway along the length of upper carriage brace 404 through holes in the top and bottom. Front panel stops 412, 413 of square steel tubing are attached perpendicularly by welding to the outside surface of front carriage members 410, 411 just above their lower ends.

Lower carriage arms 420, 421 of rectangular steel tubing are attached by welding to the rear faces of front carriage members 410, 411 at their lower ends. Lower carriage arms 420, 421 extend rearward, parallel to upper carriage arms 400, 401. Rear carriage risers 426, 427 of like material are joined perpendicularly by welding to the topside of lower carriage arms 420, 421, at their rearward ends, extending vertically. Rear panel stop 430 of square steel tubing is attached perpendicularly by welding to the top ends of rear carriage risers 426, 427, bracing them and extending laterally beyond them. Each reflector panel (see FIG. 6) rests against one end of rear panel stop 430, and against one of front panel stops 412, 413, when folded to storage position (see FIG. 1b).

Front and rear hinge-mounting plates 444, 446 are attached by welding to the underside of lower carriage arm 420. Front and rear hinge-mounting plates 445, 447 are similarly attached to the underside of lower carriage arm 421. Lower carriage arm front brace 408 of square steel tubing is perpendicularly attached by welding to connect the inner sides of lower carriage arms 420, 421, near front hinge-mounting plates 444, 445. Lower carriage arm rear brace 416 of square steel tubing is similarly attached to connect the inner sides of lower carriage arms 420, 421, near rear hinge-mounting plates 446, 447.

Reflector Support Panel Frames

A reflector support panel frame (see FIG. 5), is disposed on each side of the solar collector, constructed of square steel tubing and rectangular bar. All parts are joined by welding. Each reflector support panel frame is approximately in the shape of a square overall, with truncation of the two corners nearest lower carriage arms 420, 421. This truncation provides clearance of the chassis and ground when the reflectors are rotated for altitude adjustment. Along the sides of each reflector support panel frame are a plurality of holes drilled through the top and bottom faces, to provide for mounting of the reflector support panels (see FIG. 6) with common fasteners.

Reflector support panel frame short side 500 extends between the truncated corners. Reinforcing plates 502, 503 of steel bar are attached by welding near the ends of reflector support panel frame short side 500. Hinges 504, 505 are attached by welding one leaf to the reinforcing plates 502, 503. The other leaf of hinges 504, 505 is attached by welding to hinge-mounting plates 446, 444, 445, 447 of lower carriage arms 420, 421 (see FIG. 4). Hinges 504, 505 thus serve as pivoting lower supports for the reflector support panel frames, allowing them to be folded upright to storage position (See FIG. 1b).

Truncation segments 510, 511 are joined at 45-degree angles to the inner sides of short side 500, and to reflector panel frame front and rear sides 512, 513. Reflector support panel frame front and rear sides 512, 513 have a plurality of holes through their top and bottom faces for the mounting of a reflector panel (see FIG. 6). Cross brace 515 is perpendicularly attached by welding to connect the inner faces of reflector panel frame front and rear sides 512, 513. Lower suspension cable ears 516, 517 of steel bar are attached to the outer faces of the front and rear sides 512, 513 approximately midway between cross brace 515 and upper, outer reflector support panel frame side 520. Lower suspension cable ears 516, 517 have holes in their upper ends to permit attachment of suspension cable 530. Suspension cable 530 is adjusted and fixed at the proper predetermined length using common cable clamp, 531. In operating position, the reflector support panel frames are thus suspended from upper carriage arms 400, 401 at a predetermined operating angle of inclination with front carriage members 410, 411. Storage ear 525 which is made of steel bar is attached at is lower end to the outer face of upper, outer reflector support panel frame side 520 near its midpoint. Storage ear 525 has a hole at its upper end. When the reflector support panel frames are folded to storage position, storage ear 525 of each reflector support panel frame thus provides an attachment point for a common lanyard, to keep the two reflector panel frames folded upright. FIG. 1*b* shows an example of a common type of elastic lanyard.

Reflector Support Panels

The solar collector in the example embodiments has a reflector support panel (see FIG. 6), disposed on each side (see FIG. 1), mounted upon a reflector panel frame. The reflector support panels are of one piece, formed from a single sheet of plastic material. They are mounted to each reflector support panel frame using common fasteners through holes along the planar, perimetric reflector support panel border 630, corresponding in position to the mounting holes in each reflector support panel frame side 512, 513 (see FIG. 5). The reflector support panel has a plurality of square reflector-mount surfaces 600, each individually orientated such that when the reflector support panels are properly aligned to incoming rays of solar energy, flat reflective material mounted upon the reflector-mount surfaces 600 will reflect the rays to the solar collector's focal area, where it is absorbed by a receiver. The reflector-mount surfaces 600 are joined to each other by a multitude of triangular connecting surfaces 610.

An alignment guide of steel plate and rod, with an alignment guide base plate 620 and shadow peg 622, is mounted with mastic of uniform thickness upon a broad portion of reflector support panel border 630, adjacent to a truncated corner, at the front of the solar collector. In this location the base plate 620 has the same predetermined angle of inclination as the reflector support panel frame has with front carriage members 410, 411. The shadow peg 622 is attached to the base plate 620 longitudinally parallel to front carriage members 410, 411. The alignment guide provides a safe and comfortable visual reference for the user, allowing the reflector panels to be adjusted properly toward the sun without the user gazing at the intensely bright focal area.

Process for Making the Fresnel Array Reflector Suport Panel

Using techniques well known to those skilled in the art of computer aided design (CAD), computer software is used to generate a data file that defines the three dimensional (3D) shape of a Fresnel array concentrating reflector support panel that accepts a plurality of pieces of flat reflector material.

Initially, a focal area is defined in 3D space, by drawing and specifying the portion of a solar collector apparatus that will locate and support a receiver of concentrated solar energy at the focal area. Similarly the overall size, shape and location of the reflector support panel is defined in space by drawing the reflector carriage, (the portion of a solar tracking collector apparatus that carries the reflector support panel through the range of travel needed altitude adjustment during operation.) All intermediate connecting structure between the receiver and reflector support panel must also be drawn to define the relative positions of the focal area and reflector support panel. At the end of this process, the reflector support panel's geometric center and the center of the focal area must lie in a common vertical plane that is normal to the vertical plane of rotation of the reflector carriage.

It is generally desirable to minimize the degree of material "stretch" and stress, in forming a 3D shape from a flat sheet. This is one reason why the reflector support panel is inclined toward the focal area during operation. Another reason for reflector support panel inclination is to reduce the degree of interference between the reflectors in the Fresnel array (the high side of a reflector blocking some of the light reflected from the low side of an adjacent reflector.)

For purposes of design, it is assumed that rays of sunlight all travel along the vertical axis (as from a directly-overhead sun.) The angle of inclination of the reflector support panel is that which causes a vertical ray of sunlight incident upon the geometric center of the reflector support panel to be reflected through the center of the focal area. The law of specular reflection is used to determine the angle of inclination of the reflector support panel. The acute angle of incidence between a vertical ray and the inclined panel must equal the acute angle between the panel and the reflected ray. The reflector support panel is rotated about the axis of its attachment to the carriage until this requirement is satisfied.

Individual mount surfaces are initially drawn in the same plane as the perimetric border of the reflector support panel, which is maintained with sufficient area to provide a mounting face that can serve to mount the reflector support panel upon a supporting frame. The size of individual flat reflectors and consequently the mount surfaces is determined by the size of the desired focal area for the receiver, with the reflectors being smaller than the focal area to account for distortion in reflection and focal precision. The number of mount surfaces in the panel is estimated initially, and can be adjusted later if needed, after checking for interference between reflectors and adjusting the spacing between them, to eliminate any interference found. Alternatively, the overall size of the reflector support panel can be adjusted to accommodate a given number of mount surfaces.

In accordance with the law of specular reflection, each mount surface is individually rotated about its geometric center, so that a vertical ray of sunlight striking the geometric center is reflected to the center of the focal area. The degree of tilt needed for each mount surface to meet that criterion increases with its distance from the center of the panel. This often entails interference between adjacent reflectors, increasing with distance from the center of the panel. To avoid blocking, adjacent mount surfaces are spaced further from each other, as distance from the center of the panel increases. After each mount surface is tilted properly for reflection to the focal area, the degree of interference can be assessed by drawing rays from the lower, outer edges of the reflector mount surface parallel to the alignment ray passing through its geometric center. If a mount surface is moved to eliminate interference, it is moved along the plane of the reflector support panel, so all mount surfaces will have coplanar geometric centers. After each such move, the mount surface must be re-tilted for focal alignment and rechecked for interference, until interference is eliminated.

The above CAD process results in a 3D digital model of the reflector support panel form in which each mount surface is a Fresnel approximation of part of an elliptic paraboloid. In this embodiment the geometric centers of all mounting surfaces remain coplanar with the perimetric border of the reflector support panel, for a relatively flat, compact storage profile.

The CAD data file produced is used to guide Computer Numeric Control (CNC) machining, whereby molds or dies suitable for forming the Fresnel reflector support panel are produced, using methods well known to those skilled in the art of mold making Using methods well known to those skilled in the art of plastic thermoforming, the reflector support panel of the preferred embodiment is then formed from a sheet of heated plastic placed over the mold and drawn into a conforming shape. For cost reasons, it is contemplated that Acrylonitrile Butadiene Styrene (ABS) plastic will be used, though many other types and combinations of plastic sheet are usable. Flat reflective material of various types can then be adhered to each mount surface of the reflector support panel with a suitable adhesive applied in uniform thickness, resulting in a concentrating reflector array for use with the predefined solar apparatus.

Flattop Receiver

The flattop receiver (see FIG. 7) of the preferred embodiment is cast as one piece of aluminum, using techniques well known to those skilled in the art of metal casting. A heat transfer or cooking surface is provided as the topside of an oblong, flat plate 700. The longer edges of flat plate 700 rest upon receiver support rails 232a, 233a (FIG. 2a) of the solar collector's main frame. Flat plate 700 is semicircular at the rear end, and rectangular at the front end, corresponding to the rear and front ends of the solar collector's main frame.

The top side of flat plate 700 has a raised edge 710 along its perimeter. Raised edge 710 is taller at the semicircular end, near the focal area. This taller portion prevents food that is cooked directly on flat plate 700 from being scorched by exposure to concentrated solar energy and provides an absorbing surface for that energy, when the sun is at lower altitudes, and the solar concentrator's reflector panels are more elevated. Raised edge 710 also generally serves to retain cooking oil, food and liquid, and to catch spatter when the flattop receiver is used as a griddle. In operating position the semicircular, rear portion of flat plate 700 extends past the rear ends of receiver support rails 232a, 233a, and beyond the center of the focal area. Retainer bolts 234a, 235a (see FIG. 2a) extend down into the corners formed by the front end of the rectangular portion of raised edge 710. This retains the receiver in proper position relative to the focal area and prevents the flattop receiver tipping up at the front end and falling, if a heavy load is placed at the semicircular rear end.

From the underside of flat plate 700, a hollow, tubular energy absorber 720 extends downward through the focal area. When the sun is at higher altitudes, energy absorber 720 receives most of the concentrated energy reflected to the focal area. Heat is conducted quickly from energy absorber 720 to the topside of flat plate 700 for direct use in cooking, or for heating smaller flat-bottomed vessels.

Pot and Pan Rack

Figure 1:
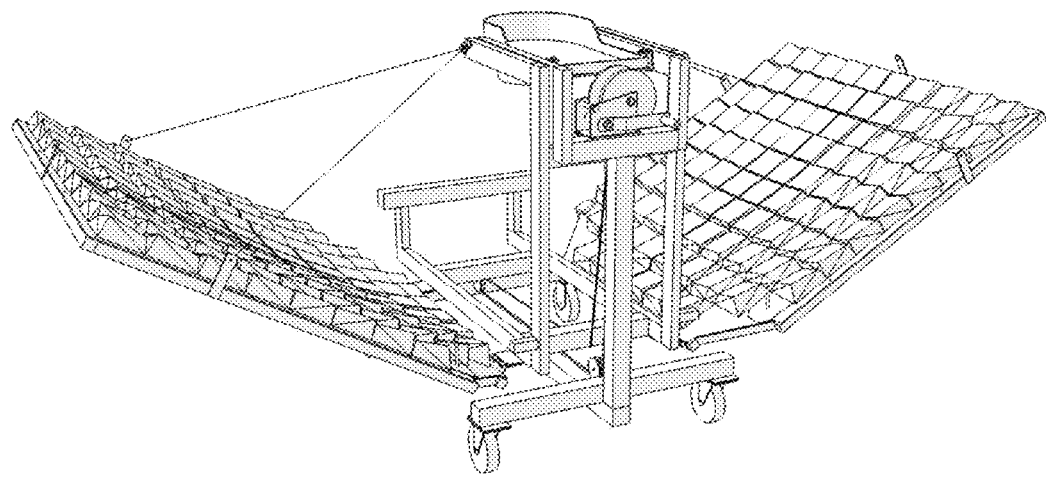
FIG. 1 is a perspective view of the preferred embodiment from the front of the collector, with the flat top receiver in place and reflector support panels positioned for overhead sun.
Figure 1A:
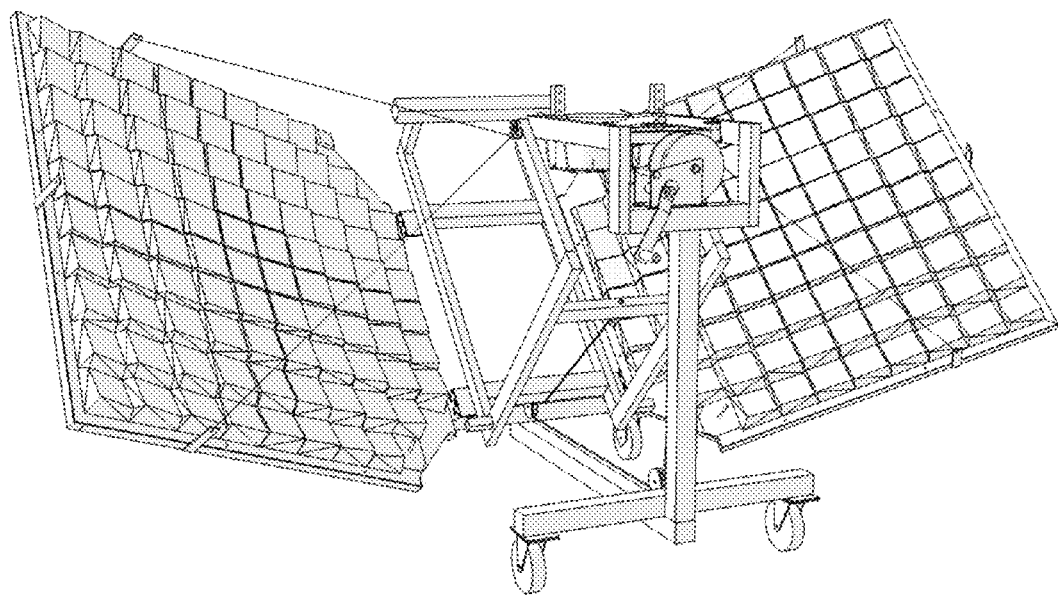
FIG. 1a is a perspective view from the front of the preferred embodiment, with the pot and pan rack supporting a large saucepan, and reflector support panels adjusted for a lower sun position.
Figure 1B:
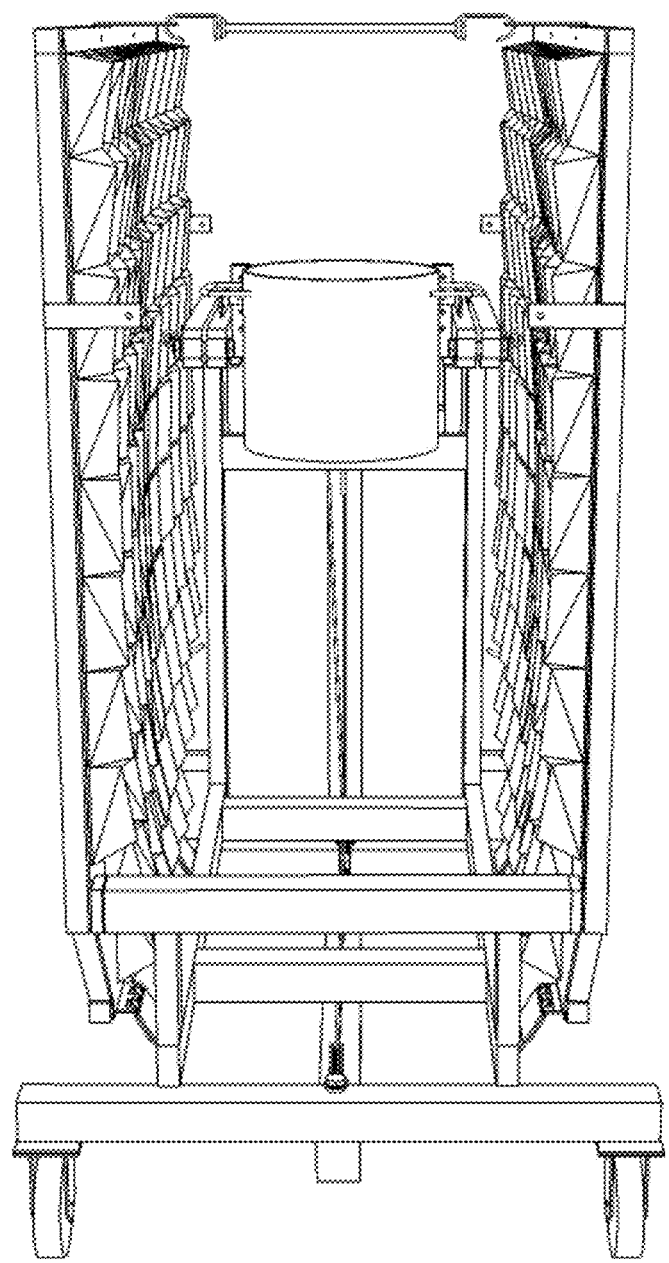
FIG. 1*b* is a view from the rear of the collector, showing reflector support panels upright for storage and held in position by a common lanyard, with a stockpot on the pot and pan rack.
Figure 7:
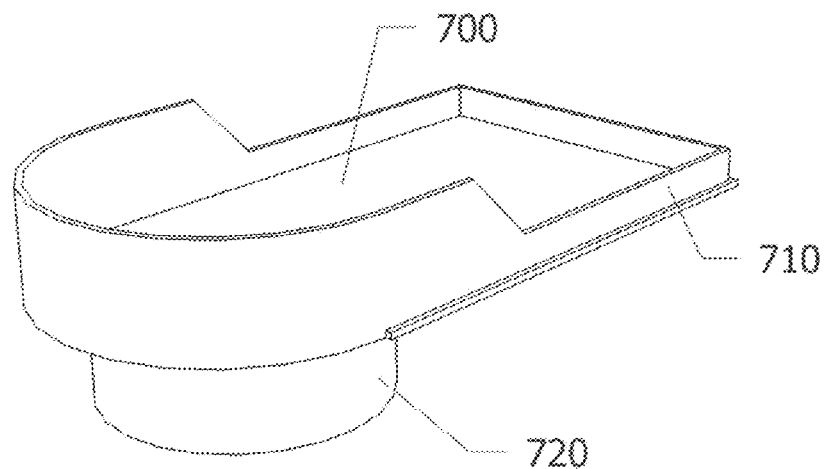
FIG. 7 is a perspective view from the rear, of the flattop receiver.
Figure 8:
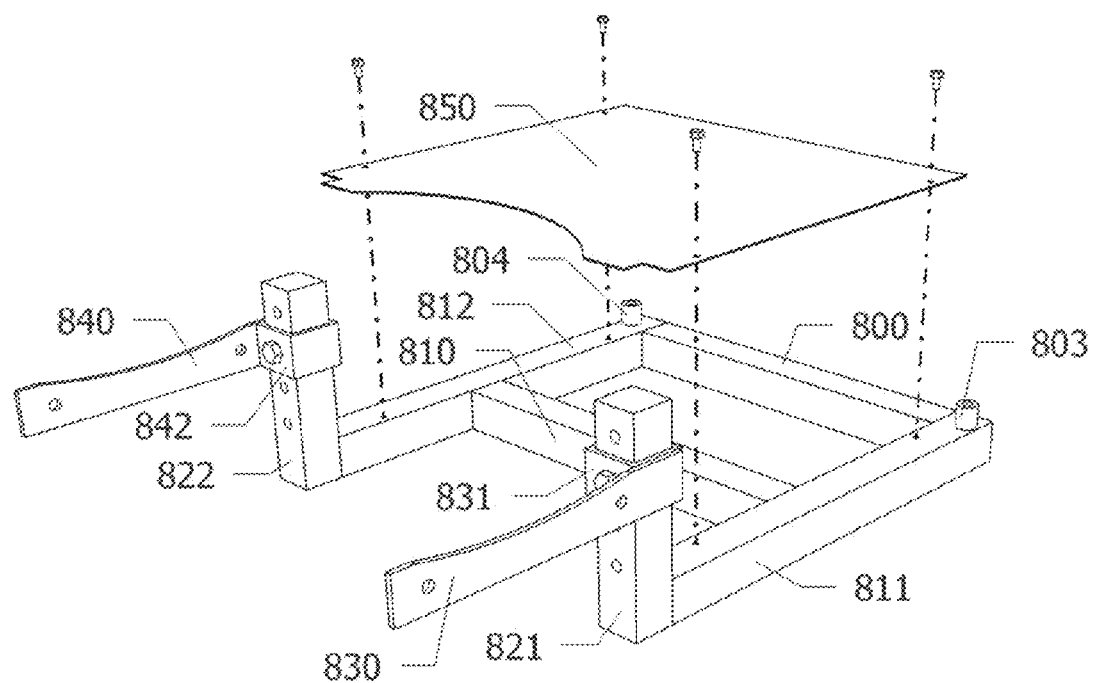
FIG. 8 is a perspective view from the rear, of the pot and pan rack, with glare shield in exploded position for clarity.

In place of the flattop receiver shown in FIG. 1 and FIG. 7, common cooking pots may be placed into the focal area using an adjustable pot and pan rack (see FIGS. 8, 1a and 1b). The pot and pan rack is mainly of steel square tubing and bar. In use, rack sides 811, 812 rest upon receiver support rails 233a, 232a (see FIG. 2a). Front cross member 800 and a rear cross member 810 are joined perpendicularly by welding to connect the inner faces of rack sides 811, 812. Stabilizer bushings 803, 804 are joined by welding to the top of rack sides 811, 812 at the front end, to receive retainer bolts 235a, 234a, and to bear against the underside of receiver retainers 237a, 236a. Thus the pot and pan rack is retained in proper position relative to the focal area, and does not tip up at the front when a heavy load is placed at the rear (focal) end. Rack risers 821, 822 feature a multitude of holes in their front and rear faces, and are joined perpendicularly by welding to the rear ends of rack sides 811, 812. Each hole in the front face of a rack riser has a corresponding hole in the rear face, vertically aligned to a common horizontal axis. Rack collars 831, 842 are short pieces of steel square tubing with inner dimensions slightly greater than the outer dimensions of rack risers 821, 822. Each collar has a hole in its front and in its rear face, one vertically aligned with the other, on a common horizontal axis. The rack collars 831, 842 can thus be slid up and down over the outside of rack risers 821, 822, and secured in various positions by aligning the holes of rack collars 831, 842 with those of rack collars 831, 842 at the desired height, and passing a common bolt or hitch pin horizontally through. Rack arms 830, 840 are of steel bar, attached by welding to the outer faces of rack collars 831, 842. Each rack arm 830, 840 extends rearward over each side of the focal area, and has a curved, concave cutout along its upper edge to help retain the diametrically opposed handles of common stockpots. Stockpot handles rest upon rack arms 830, 840, so that the lower portion of the stockpot is suspended in the focal area of the solar collector. Rack collars 831, 842 can be laterally switched in position (compare FIGS. 8 and 8a) so that rack arms 830, 840 extend from the inner faces of rack collars 831, 842. This alternate configuration can accommodate smaller stockpots, as rack arms 830, 840 are nearer each other. Each rack arm 830, 840 also has a pair of holes, from which saucepan support 860a (see FIG. 8a) can be suspended in the alternate configuration. Saucepan support 860a is of formed and spot-welded steel wire, and can support pans that have only a single handle.

Glare shield 850 of sheet metal is attached to the upper face of rack sides 811, 812 with common fasteners, to reduce user exposure to light diffusely reflected from the various pots and pans that may be used with the rack.

Operation of the Preferred Embodiment

In order to use the apparatus as a concentrating solar collector, pieces of a flat mirror-like reflective material must be mounted to the reflector-mount surfaces, with a suitable adhesive applied in uniform thickness. The reflector support panel provides pre-determined aiming of the individual pieces for convergent reflection of sunlight to the focal area. When the solar collector is in storage position, the reflector panels are folded upright, resting against the panel stops 412, 413, 430 at the front and rear of the apparatus. A common lanyard or shock-cord attached to storage ear 525 of each reflector panel frame can be used to hold the reflector panels in storage position (see FIG. 1b). To use the solar collector, it must be in a sufficiently large, open area receiving direct sun. A single adult user of average strength can roll the solar collector into position across a smooth, level surface by pulling the solar collector by the crank handle of winch 300 or by frame front risers 224, 225. Detaching the lanyard from one storage ear 525, the reflector panels can be opened outward and down, pivoting on hinges 504, 505 to operating position, supported by hinges 504, 505 and suspension cable 530.

Figure 8A:
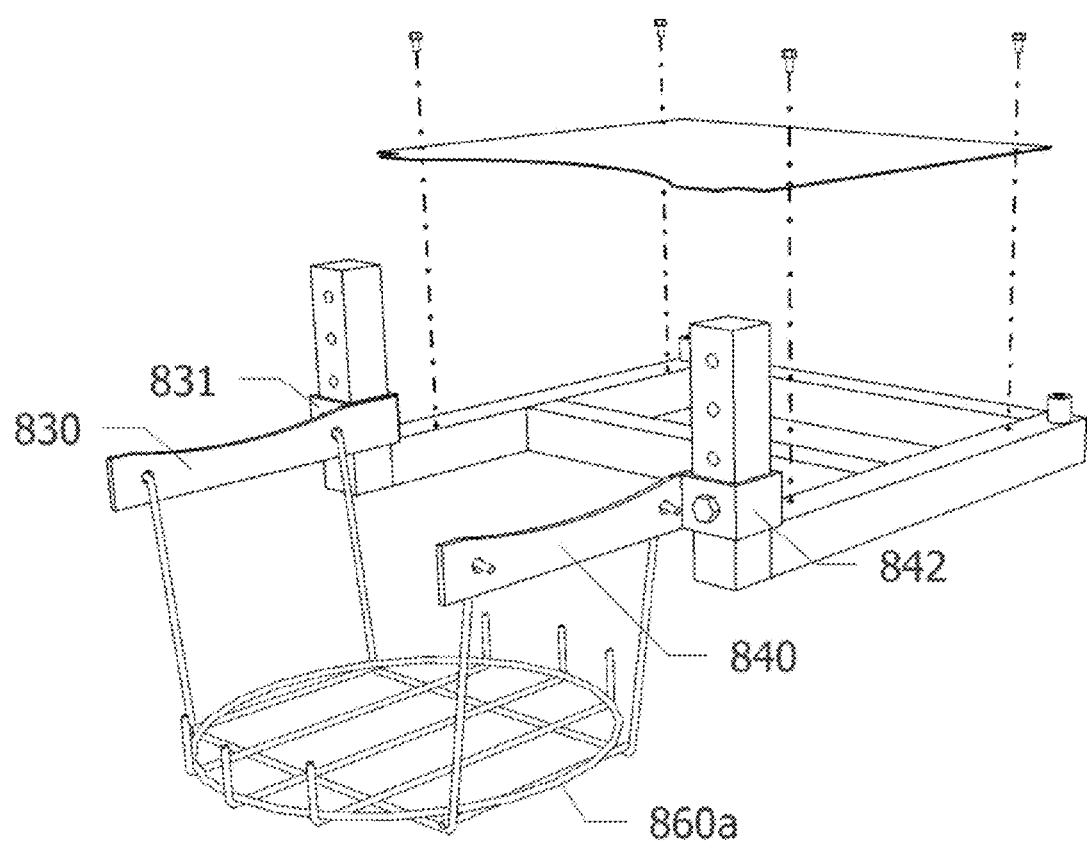
FIG. 8*a* is a perspective view from the rear, of the pot and pan rack arms in alternative position for attached wire saucepan support, and glare shield in exploded position for clarity.

Either the flattop receiver of FIG. 7 or the pot and pan rack of FIGS. 8 and 8a can be chosen by the user, depending on the type and amount of cooking to be done. The flattop receiver of FIG. 7 provides a smooth cooking surface of about ½ the area of a standard 4-burner stove top. The receiver allows direct frying as on a griddle, or the heating of smaller flat-bottom cooking vessels upon its surface, similar to a smooth-top electric stove. The pot and pan rack adjusts to accept various stock pots or saucepans, which then receive direct concentrated solar energy themselves. This arrangement may be more suitable for larger quantities of food, or when weather conditions provide less sun to the solar collector. Either the flattop receiver or the pot and pan rack is placed upon receiver support rails 232a, 233a. The flattop receiver is positioned so that retainer bolts 234a, 235a can be inserted down through the inner two holes in receiver retainers 236a, 237a and into the front corners of the receiver. This prevents the receiver sliding forward or tipping up at the front and falling off the rear end of support rails 232a, 233a. If the pot and pan rack is used, it is similarly positioned with retainer bolts 234a, 235a passing down through the outer two holes in receiver retainers 236a, 237a and into stabilizer bushings 803, 804.

Standing at the front of the solar collector, a user can quickly and comfortably observe the alignment of the solar collector with the sun, by observing the shadow cast by the alignment guide's shadow peg 622. The shadow of the peg becomes invisible, falling directly under the peg itself rather than onto base plate 620, when the solar collector is adjusted to produce maximum heat. As the sun's position relative to the earth changes, the peg's shadow reappears upon base plate 620, indicating the need and direction for readjustment, in order to maximize the heat produced. The solar collector's positional adjustments are made at 10-20 minute intervals during operation to maintain the amount of energy reaching the receiver.

Altitude is adjusted by turning the hand-crank winch 300, which also holds the reflectors in position following adjustment. When altitude cable 310 is drawn in by winch 300, the reflector carriage and attached reflector panels move in a rearward and upward direction, rotating about pivot bolts 241a, 242a and the focal area that lies between them. When altitude cable 310 is paid out, the reflector panels descend toward the front of the solar collector by virtue of their own weight. The altitude cable system, together with the main frame of the concentrator, can provide 90 degrees reflector rotation, though the fullest extent of rotation would rarely be useful (unless the user is commonly warming food on a mountaintop at sunrise or sunset.)

Azimuth adjustments are made using the crank handle of winch 300 to roll the front end of the solar collector sideways, facilitated by swivel casters 210, 211. This can be quickly and easily done, simultaneously with altitude adjustment. The alignment guide also indicates the proper direction and degree of azimuth adjustment needed.

An adult user of ordinary physical size and capability can conveniently and easily make azimuth and altitude adjustments at the same time, with one hand, from the same position in which cooking activity is performed. Adjustments do not require a user to reach near or past the focal area or hot cooking vessels. There is no need to drag or tilting the concentrator and cooking vessels for reflector adjustment, so tipping, spillage or dislodgement of cooking vessels is not a problem. If a user fails to make timely altitude and azimuth adjustments, the amount of heat received will decline, as the relative position of the sun changes and reflector focus is lost. This naturally prevents food being burned during cooking, and prevents waste. If less heat is desired during cooking, attenuation can be obtained by maintaining an alignment guide peg shadow of varying length; a longer shadow corresponds to less heat. Other ways to reduce the amount of heat reaching the food being cooked include: Moving the food or cooking vessels further from the focal end of the receiver, draping a cloth over some of the reflectors, or misting water onto the receiver.

Additional Embodiment: Stationary Installation

The solar collector may also be configured for a fixed location, with a few physical differences from the preferred embodiment, as described below. FIG. 2b shows an exemplary embodiment, for ground installation.

Figure 2C:
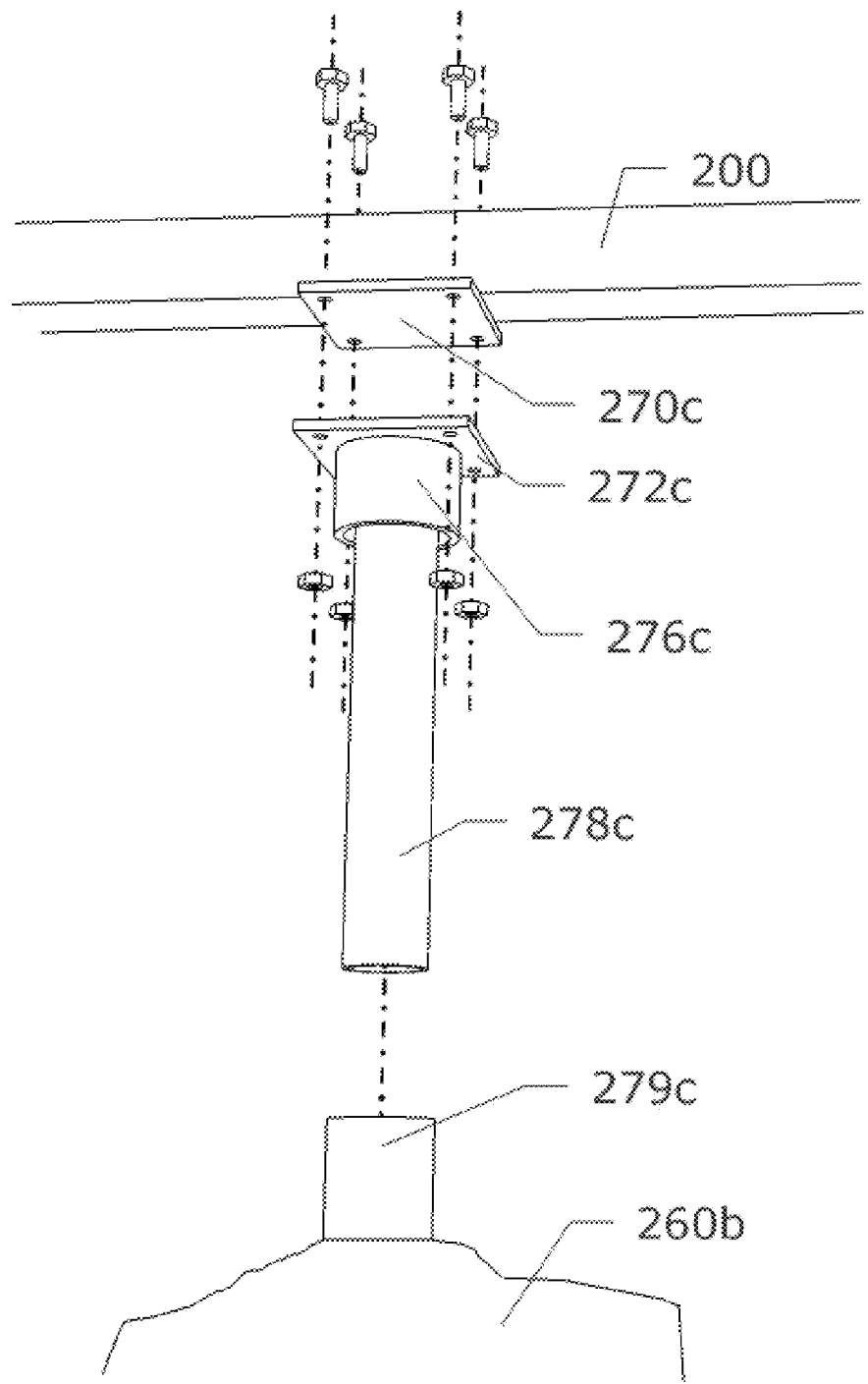
FIG. 2*c* is an exploded detail view of an additional embodiment: Installation of the collector in a fixed location.

Front pulley 262b and rear pulley 264b serve respectively in place of primary pulley 320 and secondary pulley 330 of the first exemplary embodiment, in the otherwise identical altitude cable system. A square, steel base plate 270c (see FIG. 2c) is attached by welding to the underside of base beam 200, approximately midway along its length. Base plate 270c has holes for common fasteners at its four corners.

For stationary installation, an outer sleeve 279c, being a length of steel pipe with bottom end plugged, is set plumb in an excavation with depth sufficient to provide a stable, solid base for the solar collector. Concrete footing 260b is poured into the excavation around outer sleeve 279c and given time to cure. An inner sleeve 278c, being steel pipe with somewhat shorter length than outer sleeve 279c, and with an outer diameter slightly smaller than the inner diameter of outer sleeve 279c, is centered on one side of pivot plate 272c, and joined perpendicularly to it by welding. Pivot plate 272c is otherwise identical to base plate 270c. Debris shield 276c, being a short piece of steel pipe with inner diameter slightly larger than the outer diameter of outer sleeve 279c, is slid to a concentric position over inner sleeve 278c and against pivot plate 272c, and joined perpendicularly to the pivot plate 272c by welding. The debris shield 276c serves to exclude rain, dirt and debris from the space between inner sleeve 278c and outer sleeve 279c.

Pivot plate 272c, in solid assembly with inner sleeve 278c and debris shield 276c, is then bolted to base plate 270c of the solar collector's main frame, with common fasteners. The main frame of the solar collector can then be set into position by sliding inner sleeve 278c down into outer sleeve 279c, so that debris shield 276c surrounds the upper end of outer sleeve 279c. The steel parts below base plate 270c collectively provide a simple, durable bearing for a ground-based pivot to provide for support and rotation of the entire solar collector.

Operation of the Additional Embodiment: Stationary Installation

In the exemplary embodiment for stationary installation of the solar collector described above, operational differences are minimal. In storage position, the user may wish to cover the solar collector with a protective tarp, as it will remain outdoors. In operating position, azimuth adjustments are made by grasping the handle of the winch 300 and turning the solar collector sideways, about its ground-based pivot. All other aspects of operation are unchanged from the first exemplary embodiment.

Conclusion, Ramifications and Scope of Invention

The exemplary embodiments of my solar collector apparatus described above describe just two of many possible embodiments of the invention. Details in the above descriptions were chosen for simplicity, low cost and ease of solar collector construction, using relatively limited resources.

Below are discussed some of many possible variations in the invention. These possibilities should help to show that the scope of the invention should be determined by the elements of the claims and their legal equivalents, rather than by the particular details chosen for specification of exemplary embodiments.

Alternative Materials, Methods: Tubing profiles named in the above specifications may be varied with minor design consequences, many different types of tubing or solid stock can be used, with many different possible profiles, such as cross-sections that are oblong, rectangular, rounded, or convoluted. One material alternative to steel is aluminum. More costly, but lighter weight and more resistant to corrosion by weather exposure, nearly every part of the solar collector that is specified in steel could be rendered in aluminum. Fiber-reinforced plastic is another alternative material of which many parts could be made. Assembly could involve various joining braces or fittings, rivets or other fasteners, or brazing rather than joining parts by welding.

The reflector support panels (specified in ABS plastic) could be made of sheet aluminum or other pure or alloyed metal, pressed or stamped between opposing dies. There are also many different types of plastic, and combinations of different types, that could be used to form the reflector support panels from extruded sheet. An obvious alternative process in the method for making them could use the CAD data file to machine molds for the formation of the reflector support panels by injection molding techniques, rather than thermoforming. Another type of mold could be made to fabricate the reflector support panels from fiberglass.

There are various coatings available that could be applied to plastic or to metal parts for weather resistance. Stainless steel could be used for cable and other higher-stress parts such as the winch, for greater durability and to reduce the need for weather protection and maintenance.

Design: The design of the solar collector could be modified in many ways. For example the overall frame and reflector carriage could be modified to a curved side-view profile, so that rather than a rectangular shape, they would have a rounded "C" shape, produced by casting or bent-tube construction. Many possible shapes could meet the requirement for the main frame and reflector carriage, that there be clear passage for light from reflectors to the focal area, throughout the range of reflector rotation. The reflector carriage design may echo the shape of the main frame or be rendered as a closed rectangle (seen in some prior art), or closed or open ovoid, circular or irregular shape.

The overall shape of the reflector panels could be varied, also. The exemplary embodiment, having reflector mount surfaces with coplanar geometric centers, favors minimizing the overall depth of the reflector panel, but tends to increase the amount of stretch required from the material to be formed. It would also be possible to minimize material stretch by placing the geometric centers of the mount surfaces in different planes, and reduce interference among reflectors, making the overall contour of the reflector panel somewhat concave when viewed from above. Mount surfaces could be made concave to conform to applicable concave reflectors.

The altitude cable system could be simplified, using just one pulley or other direction-changing device like a simple half-ring cable guide, at the bottom of the vertical support 220, for a direction reversal of the cable so it courses back up to the transverse member 222 or to a higher or otherwise different anchor point. This would decrease the range of carriage travel, and add physical strain in the mechanism and carriage, but still allow elevation through much of the usable range of reflector rotation. Pulleys could be replaced with various forms of plastic or metal cable guides, even by simple holes drilled in the frame.

Many other parts could also be varied from those specified. Fixed casters could be replaced with wheels mounted on the ends of a fixed axle. Swivel casters could be replaced with some variation of a pivoting axle and fixed wheels, as is commonly seen on a child's wagon. Axletrees could be lengthened or otherwise modified in form, or the height of the main frame could be increased, to accommodate larger wheels, making transport across rough terrain easier. The location and shape of cable attachment ears could be varied. Small tension-equalizing pulleys could be used instead of the suspension cable rings, or the rings could simply be eliminated. Bracing among main frame or reflector frame members could be varied in position or form, in many different ways. The flattop receiver's energy absorber could have a variety of different shapes, such as an X-shaped or I-shaped or S-shaped cross-section, as examples. The rear end could be rectangular rather than rounded, oval rather than semicircular, etc.

Efficiency: The efficiency of the solar collector could be improved by reducing heat losses, using a greenhouse effect, and insulation. The focal area could trap collected heat with a receiver enclosure having glass sides, and bottom, or a heat-reflective, insulating bottom. Addition of insulating material to the front portion of the flattop receiver would also tend to increase available heat. For example, a removable top side insulator could be placed over the front portion of the flattop receiver when not in use, or over the entire top surface for preheating. A fixed layer of insulation could be added to the area immediately under the front portion of the flattop receiver, between the receiver arms, leaving sun struck areas of the energy absorber exposed, of course. Insulation strips between the receiver support rails and the side edges of the flattop receiver would also reduce heat loss to the solar collector frame by avoiding metal-metal contact. There is also the possibility of adding a third, smaller reflector frame and panel, deployed beyond the rear end of the main frame, having rigid bracing to prevent it tipping forward upon elevation. Rigid bracing could also be added between the existing reflector frames and main frame, to prevent wind causing them to fold toward storage position during operation, when the wind is strong enough to overcome the weight of the reflector frames and panels.

Uses: The preferred embodiment of the solar collector is designed primarily for cooking; but its utility can be easily extended beyond cooking Solar thermal energy concentrated by a smaller, point-of-use solar collector has many possible uses that require the presence of an attendant for other tasks, making the additional task of manual adjustments insignificant as an added labor cost. The manual task of performing altitude and azimuth adjustments adds no significant burden to many such activities. For example, a receiver in the form of a boiler would permit use of the solar collector to power a steam cleaner with a flexible hose and wand, such as is currently available to consumers as an electric appliance. Steam produced could be used in an autoclave to sterilize medical instruments, or to kill weeds, to preserve and can food, or to run a small steam engine powering various tools or processes. Distillation is another process using heat that could be powered in a distributed fashion, such as for the production of ethanol fuel.

Scale: There is potential for scaling up in size that would serve many of the above alternative uses well. Multiple Fresnel panels could be produced and combined upon a larger supporting frame, for a larger reflector aperture and an increase in collected energy. I estimate that a single user could perform manual two-axis tracking without much modification to the present design, scaled to a reflector area increase by a factor of four. The solar collector could also be scaled down, for more compact storage and a smaller operating area.

Thus there are many possible modifications and variations as well as improvements on the invention, and it is apparent that the claims and their elements have many legal equivalents.

List of Reference Numerals

Note: The hundreds digit of each reference numeral corresponds to the Fig number in which the referenced structure first appears. Reference numerals with a letter suffix, appear first in the Fig number matching both the hundreds digit and the letter suffix.

Main Frame (FIG. 2):
200: Base
202: Axletree, front
204: Axletree, rear
206: Caster Mounting Plate
207: Caster Mounting Plate
208: Caster Mounting Plate
209: Caster Mounting Plate
210: Caster, swivel
211: Caster, swivel
212: Caster, fixed
213: Caster, fixed
214: Winch Support
220: Vertical Support
222: Transverse Member
224: Front Frame Riser
225: Front Frame Riser
226: Receiver Arm
227: Receiver Arm Main Frame detail (FIG. 2a):
228a: Frame Pivot Bushing
229a: Frame Pivot Bushing
232a: Receiver Support Rail
233a: Receiver Support Rail
234a: Retainer bolt
235a: Retainer bolt
236a: Receiver Retainer
237a: Receiver Retainer
241a: Pivot Bolt
242a: Pivot Bolt
243a: Thrust Washer
244a: Thrust Washer
245a: Thrust Washer
246a: Thrust Washer
247a: Thrust Washer
248a: Thrust Washer
249a: Lock Nut
250a: Lock Nut Main Frame, fixed installation (FIG. 2b):
262b: Pulley, front
264b: Pulley, rear
260b: concrete footing Detail of Ground-based Pivot (FIG. 2c):
270c: Base Plate
272c: Pivot Plate
276c: Debris Shield
278c: Inner Sleeve
279c: Outer Sleeve Altitude Cable System (FIG. 3):
300: Winch
310: Altitude Cable
320: Primary Pulley
322: Primary Anchor Bolt
330: Secondary Pulley
332: Secondary Anchor Bolt
340: Eyebolt Reflector Carriage (FIG. 4):
400: Upper Carriage Arm
401: Upper Carriage Arm
402: Carriage Pivot Bushing
403: Carriage Pivot Bushing
404: Upper Carriage Brace
408: Lower Carriage Arm Front Brace
410: Front Carriage Member
411: Front Carriage Member
412: Front Panel Stop
413: Front Panel Stop
416: Lower Carriage Arm Rear Brace
420: Lower Carriage Arm
421: Lower Carriage Arm
426: Rear Carriage Riser
427: Rear Carriage Riser
430: Rear Panel Stop
444: Hinge-Mounting Plate, front
445: Hinge-Mounting Plate, front
446: Hinge-Mounting Plate, rear
447: Hinge-Mounting Plate, rear Reflector Carriage, Upper Detail (FIG. 4a):
451a: Upper Suspension Cable Ear
452a: Upper Suspension Cable Ear
453a: Suspension Cable Rings
454a: Suspension Cable Rings Reflector Panel Frame (FIG. 5)
500: Reflector panel frame Side, Short
502: Reinforcing Plate
503: Reinforcing Plate
504: Hinge
505: Hinge
510: Truncation Segment, Front/Rear
511: Truncation Segment, Front/Rear
512: Reflector panel frame Side, Front/Rear
513: Reflector panel frame Side, Front/Rear
515: Cross Brace
516: Lower Suspension Cable Ear, Front/Rear
517: Lower Suspension Cable Ear, Front/Rear
520: Reflector panel frame Side, Upper Outer
525: Storage Ear
530: Reflector Frame Suspension Cable Reflector Panel (FIG. 6):
600: Reflector-Mount Surface
610: Connecting Surface
620: Alignment Guide Base Plate
622: Shadow Peg
630: Reflector Panel Border Flattop Receiver (FIG. 7):
700: Flat Plate
710: Raised Edge
720: Energy Absorber Pot and Pan Rack (FIG. 8):
800: Front Cross Member
803: Stabilizer Bushing
804: Stabilizer Bushing
810: Rear Cross Member
811: Rack Side
812: Rack Side 821: Rack Riser
822: Rack Riser
830: Rack Arm
831: Rack Collar
840: Rack Arm
842: Rack Collar
850: Glare Shield
Pot and Pan Rack, Alternate Configuration (FIG. 8a)
860a Saucepan Support

I claim:

1. An apparatus to facilitate manual 2-axis solar tracking, concentration and reception of solar energy, comprising:
    (a) a main frame having a front end and a rear end, two parallel elongated receiver support arms extending horizontally from said front end toward said rear end and terminating approximately mid-way between said front end and said rear end on opposite sides of a focal area, each said receiver support arm further having a receiver support rail and a receiver retainer attached to its inward side, each said receiver support arm further having at its rearward end a reflector carriage pivot, said reflector carriage pivots further having a common horizontal axis of rotation, said main frame further having at said front end an elongated vertical support for said receiver support arms, said vertical support further having near its upper end a mounting location for a winch, said vertical support further being fixedly attached at its lower end to an elongated horizontal base beam having length approximately twice that of each said receiver support arm, said base beam thus extending from said front end to said rear end of said main frame,
    (b) a pivotable reflector carriage having two sides, each said side having structure that is substantially a mirror-image of the other side, each said side being suspended from said main frame at one of said reflector carriage pivots, each said side of said reflector carriage further having an elongated upper carriage arm extending horizontally from said carriage pivot toward said front end and along the outward side of a said receiver support arm of said main frame, each said upper carriage arm being attached at said front end to a vertical front carriage member, each said front carriage member being attached at its lower end to a lower carriage arm extending horizontally to said rear end of said main frame, said reflector carriage further having an upper carriage brace connected perpendicularly to each said side of said reflector carriage adjacent the connections of said upper carriage arms to said front carriage members, said reflector carriage further having a front brace connected perpendicularly to each said side of said reflector carriage adjacent the connections of said front carriage members and said lower carriage arms, said reflector carriage further having a rear brace connected perpendicularly to each said side of said reflector carriage adjacent the rear end of said lower carriage arms,
    (c) a means for pivoting and holding said reflector carriage comprising said winch, a cable that can be drawn in, paid out and held at any position by said winch, a primary pulley attached to said main frame adjacent the connection of said vertical support to said base beam, and a secondary pulley attached to said base beam adjacent said rear end, said cable passing downward from said winch, turning approximately 90 degrees around said primary pulley and thence passing horizontally along said base beam to said secondary pulley, turning approximately 180 degrees around said secondary pulley and thence returning frontward, passing under said rear brace and wrapping approximately 90 degrees around said front brace, thence passing upwards to a terminal anchor point near said upper carriage brace,
    (d) a means for easily and smoothly rotating said apparatus about a vertical axis, and
    (e) one or two reflector support panel frames, each disposed singularly on one of the two sides of said apparatus and attached to one side of said reflector carriage, so that said reflector support panel frames move together with said reflector carriage about said reflector carriage pivots, each said reflector support panel frame providing surfaces for attachment of a reflector support panel and surfaces for both perimetric and intermediate support of a reflector support panel,
        whereby in any approximately level location at any time between sunrise and sunset, a receiver can be supported and retained without tipping or falling, in a position extending substantially beyond the rearward ends of said receiver support arms and through said focal area, a reflector support panel designed specifically for use with said apparatus can be mounted upon one or both said reflector support panel frames and be positioned with said apparatus so that any flat reflective material used with such a compatible reflector support panel will reflect solar energy convergently to a receiver at said focal area without obstruction, and a single user of ordinary size and strength positioned at said front end can easily, quickly and precisely perform all adjustments for 2-axis solar tracking and reach a receiver at said focal area to attend to any heat-driven process as needed, without undue risk of injury from heat accumulated by a receiver at said focal area or from exposure to concentrated solar energy that is either directly reflected from reflective material or diffusely reflected from a receiver at said focal area.

2. The apparatus of claim 1, wherein said means for rotating said horizontal base of said main frame about a vertical axis is an elongated sleeve bearing comprising
    (a) a rotating inner sleeve in the form of a vertically elongated round tube fixedly attached to the underside of said horizontal base beam and normal to said base beam, and
    (b) a non-rotating outer sleeve in the form of a vertically elongated round tube of length approximately equal to that of said inner sleeve, said outer sleeve further having an inner diameter slightly larger than the outer diameter of said inner sleeve, said outer sleeve further having an outer diameter slightly smaller than the inner diameter of said debris shield, said outer sleeve further being fixedly embedded plumb and substantially below the surface upon which a user stands,
        whereby said apparatus is supported upright and turns through a horizontal plane for azimuth adjustment without tilting, tipping or dragging of any part of said apparatus, dirt and debris are excluded from the space between said inner sleeve and said outer sleeve, said apparatus can be readily lifted and removed from said outer sleeve, and said outer sleeve protrudes minimally above the surface in which it is embedded, presenting no obstacle to maintenance and alternative use of the location.

3. The apparatus of claim 1, wherein said means for rotating said horizontal base about a vertical axis is essentially a rolling chassis, comprising
   (a) a rear axletree having a rigid caster at each end, said rear axletree being transversely attached to the rear end of said base beam, and
   (b) a front axletree having a swivel caster at each end, said axletree being transversely attached to the front end of said base beam,
      whereby a stable base of support for said apparatus is provided, said front end can be easily rolled from side to side for azimuth adjustment of said reflector support panel frames without tilting, tipping or dragging of any part of said apparatus, and said apparatus is also easily transported, said front end being steerable and said apparatus being easily pulled or pushed by the handle of said winch.

4. The apparatus of claim 1, wherein said reflector support panel frame has a hinged attachment to said lower carriage arm so that said reflector support panel frame can be folded to an upright storage position, whereby any reflective material used with said apparatus is better protected against weather, damage and soiling, and said apparatus has a more compact profile for storage.

5. The apparatus of claim 1, further including a flattop receiver made of thermally conductive material that is supported by said receiver support rails, comprising
   (a) a rectangular flat plate with a top side and a bottom side, said flat plate having a predetermined size so that two opposite edges rest upon said receiver support rails, its front corners lie under said receiver retainers, and a rear portion of it extends beyond the rearward ends of said receiver support arms,
   (b) a raised edge of solid material and continuous surface, above and along the perimeter of said top side, said raised edge having a taller part around the rearward end and a shorter part around the frontward end of said top side, and
   (c) an energy absorber of thermally conductive material having a continuous solid surface protruding vertically downward from the rearward end of said bottom side, said energy absorber having sufficient size and extent to fully occupy the portion of said focal area that is below said receiver support rails,
      whereby said flattop receiver is retained in position without sliding or tipping during cooking activities, and when a suitable reflector support panel is used with said apparatus and proper 2-axis adjustments are made, convergently reflected rays of solar energy variously strike said energy absorber, said bottom side and said raised edge of said receiver at various times during the day with little to no interference from supporting structure under said receiver, resulting in efficient accumulation and conduction to said top side surface where food is directly fried or boiled and liquid associated with frying or boiling directly upon said top side surface is contained by said top side and said raised edge, food is shielded from direct exposure to concentrated solar energy to prevent scorching, and spatter from the cooking surface that would otherwise tend to soil reflector material is contained by said taller part of said raised edge.

6. The apparatus of claim 1, further including an adjustable receiver suspension rack, said rack comprising
   (a) a frame having two sides that rest upon said receiver support rails, each said side extending at the front end under a said receiver retainer, each said side having a rearward termination at a point of attachment to
   (b) a vertical rack riser of rectangular tube having a plurality of positioning holes through two sides, regularly spaced in a column along its height, each said rack riser accepting
   (c) a rack collar of rectangular tube that fits around said rack riser and can slide up and down said rack riser, each said rack collar further having a hole through two sides, each said rack collar further having attached to one side a rack arm extending above and to one side of said focal area to support the diametrically opposed side handles of many common cooking pots, each said rack collar and arm further being removable to laterally switch places with the other, so that the distance between said rack arms is variable,
      whereby cooking pots of various widths can be suspended by their diametrically opposed side handles in proper position at said focal area to serve as receivers of solar energy, by setting both rack collars to an appropriate height and passing a common bolt or hitch pin through said holes in each said rack collar and through said positioning holes in each said rack riser, and when a suitable reflector support panel is used with said apparatus and proper 2-axis adjustments are made, all convergently reflected rays of solar energy will reach the cooking pot without obstruction.

7. The apparatus of claim 1, further including one or two reflector support panels, each mounted to one said reflector support panel frame, each said reflector support panel being of one single continuous piece formed from a single sheet of material, and having a multitude of flat surfaces, comprising:
   (a) a plurality of reflector-mount surfaces, each disposed separately from the others, each said reflector-mount surface permitting the mounting, removal and replacement of a single, separate piece of flat reflector material to be affixed with a suitable adhesive applied in uniform thickness so that each said reflector-mount surface and mounted piece of reflector material lie in essentially parallel planes, each said reflector-mount surface further being tilted at a predetermined different angle and in a predetermined different direction to effect convergent reflection of solar energy to said focal area, each said reflector-mount surface further being spaced apart from the other said reflector-mount surfaces by a distance increasing with the distance of each said reflector-mount surface from the center of said reflector support panel, to prevent blocking of reflected light,
   (b) a multitude of flat triangular surfaces joining and maintaining proper orientation and position of reflector-mount surfaces, by corrugating the area between said reflector-mount surfaces with multi-directional ridges formed by the edges of said triangular surfaces, to stiffen said reflector support panel against flexion along lines formed by the edges of said reflector-mount surfaces, and
   (c) a planar border area having a narrow perimetric strip for mounting said reflector support panel to said reflector support panel frame using common fasteners or a suitable adhesive, said perimetric strip being supported over it's entire area by said reflector support panel frame, said border area further having one or more wider portions,
      whereby said reflector support panel, mounted upon said reflector support panel frame, can provide support, predetermined positioning and orientation for a multitude of flat pieces of reflector material that may be mounted to a reflector-mount surface, and individual pieces of reflector material may be detached and replaced if damaged, and reflector support panel flexion with consequent loss of focal precision is minimized so that when proper 2-axis adjustments are made, sunlight incident upon mounted pieces of reflector material is precisely and convergently reflected to said focal area.

8. The apparatus of claim 7, further including a solar alignment guide mounted to a said wider portion of said flat border area of said reflector support panel, comprising
   (a) a flat base plate, attached to said reflector support panel so that base plate and said flat border area of said reflector support panel lie in essentially parallel planes, and
   (b) an elongated shadow peg attached at one end to said base plate at a predetermined angle, so that, following the mounting of reflector material upon said plurality of reflector-mount surfaces, said shadow peg is longitudinally oriented parallel to rays of sunlight incident upon said reflector material, when incident rays of sunlight are specularly reflected to said focal area,
   whereby a user positioned at said front end may quickly, easily and comfortably assess the direction and extent of altitude and azimuth adjustments needed by viewing said solar alignment guide, and assessing the position of the shadow cast by said shadow peg rather than gazing at said focal area itself, thereby avoiding exposure of the user's eyes to intense, diffusely reflected light.

9. A reflector support panel assembly comprising a reflector support panel being of one single continuous piece formed from a single sheet of material, and having a multitude of flat surfaces, comprising:
   (a) a multitude of separate reflector-mount surfaces, each said reflector-mount surface permitting the mounting, removal and replacement of a single, separate piece of flat reflector material to be affixed with a suitable adhesive applied in uniform thickness so that each said reflector-mount surface and mounted piece of reflector material lie in essentially parallel planes, each said reflector-mount surface further being tilted at a predetermined different angle and in a predetermined different direction to effect convergent reflection of solar energy to a focal area, each said reflector-mount surface further being spaced apart from the other said reflector-mount surfaces by a distance increasing with the distance of each said reflector-mount surface from the center of said reflector support panel, to prevent blocking of reflected light,
   (b) a plurality of flat triangular surfaces adjoining each side of each said reflector-mount surface to maintain proper orientation and position of said reflector-mount surfaces, by corrugating the area between said reflector-mount surfaces with multi-directional ridges formed by the edges of said triangular surfaces, that stiffen said reflector support panel internally against effectively hinge-like lines of flexion across said reflector support panel that would otherwise result from the linearly aligned edges of said reflector-mount surfaces, and
   (c) a border area in a single plane, having a narrow perimetric strip for mounting said reflector support panel to a reflector support panel frame using common fasteners or a suitable adhesive, said border area further having one or more wider portions,
   said reflector support panel assembly further comprising a reflector support panel frame conforming in shape to said perimetric strip of said reflector support panel and also having a cross brace so that attached said reflector support panel is contacted and supported along its entire said perimetric strip and also at a point near its geometric center,
   whereby said reflector support panel, mounted upon said reflector support panel frame, itself provides support, predetermined positioning and orientation for a multitude of flat pieces of reflector material, by each being mounted to a reflector-mount surface, and individual pieces of reflector material may be detached and replaced if damaged, reflector support panel flexion with consequent loss of focal precision is minimized, and reflector support panel frame provides strong supporting structure and the ability to attach said reflector support panel assembly to an apparatus facilitating 2-axis solar tracking, so that when said reflector support panel assembly is used with an apparatus facilitating 2-axis solar tracking and proper adjustments are made, sunlight incident upon mounted pieces of reflector material is precisely and convergently reflected to a receiver located at said focal area.

* * * * *